US009344707B2

(12) United States Patent
Lee et al.

(10) Patent No.: US 9,344,707 B2
(45) Date of Patent: May 17, 2016

(54) PROBABILISTIC AND CONSTRAINT BASED ARTICULATED MODEL FITTING

(71) Applicant: Microsoft Technology Licensing, LLC, Redmond, WA (US)

(72) Inventors: Kyungsuk David Lee, Redmond, WA (US); Alexandru Balan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 762 days.

(21) Appl. No.: 13/688,064

(22) Filed: Nov. 28, 2012

(65) Prior Publication Data

US 2013/0329011 A1 Dec. 12, 2013

Related U.S. Application Data

(63) Continuation of application No. 13/172,241, filed on Jun. 29, 2011, now abandoned.

(51) Int. Cl.
*H04N 13/02* (2006.01)
*G06T 17/00* (2006.01)
*G06F 3/01* (2006.01)
(Continued)

(52) U.S. Cl.
CPC ............ *H04N 13/0275* (2013.01); *G06F 3/011* (2013.01); *G06T 7/0046* (2013.01); *G06T 17/00* (2013.01); *G06T 19/20* (2013.01); *G06F 3/017* (2013.01); *G06T 2200/04* (2013.01); *G06T 2207/10028* (2013.01); *G06T 2207/30196* (2013.01); *G06T 2219/2016* (2013.01); *H04N 13/0271* (2013.01)

(58) Field of Classification Search
CPC ......... G06F 3/011; G06F 3/017; G06F 17/00; G06F 19/20; G06F 2200/04; G06F 2207/10028; G06F 2207/30196; G06F 2219/0216; G06F 7/0046; H04N 13/0271; H04N 13/0275
See application file for complete search history.

(56) References Cited

U.S. PATENT DOCUMENTS 5,930,379 A 7/1999 Rehg et al.
6,674,877 B1 1/2004 Jojic et al.
(Continued)

OTHER PUBLICATIONS

Tracking human motion with multiple cameras using an articulated model, Moschini et al, "MIRAGE '09 Proceedings of the 4th International Conference on Computer Vision/Computer Graphics Collaboration Techniques, D May 2009".*

(Continued)

*Primary Examiner* — Mohammed Rahaman
(74) *Attorney, Agent, or Firm* — Micah Goldsmith; Judy Yee; Micky Minhas

(57) ABSTRACT

A depth sensor obtains images of articulated portions of a user's body such as the hand. A predefined model of the articulated body portions is provided. Representative attract points of the model are matched to centroids of the depth sensor data, and a rigid transform of the model is performed, in an initial, relatively coarse matching process. This matching process is then refined in a non-rigid transform of the model, using attract point-to-centroid matching. In a further refinement, an iterative process rasterizes the model to provide depth pixels of the model, and compares the depth pixels of the model to the depth pixels of the depth sensor. The refinement is guided by whether the depth pixels of the model are overlapping or non-overlapping with the depth pixels of the depth sensor. Collision, distance and angle constraints are also imposed on the model.

18 Claims, 16 Drawing Sheets

(51) Int. Cl.
*G06T 19/20* (2011.01)
*G06T 7/00* (2006.01)

(56) References Cited

U.S. PATENT DOCUMENTS

| 7,158,656 | B2 | 1/2007 | Covell et al. | |
|---|---|---|---|---|
| 2006/0274070 | A1* | 12/2006 | Herman | A63F 13/10 345/474 |
| 2008/0152218 | A1 | 6/2008 | Okada | |
| 2010/0066760 | A1* | 3/2010 | Mitra | G06T 19/20 345/629 |
| 2010/0111374 | A1 | 5/2010 | Stoica | |
| 2010/0197399 | A1 | 8/2010 | Geiss | |
| 2010/0278384 | A1 | 11/2010 | Shotton et al. | |
| 2011/0267344 | A1* | 11/2011 | Germann | G06K 9/00201 345/420 |

OTHER PUBLICATIONS

Articulated Body Posture Estimation from Multi-Camera Voxel Data, Mikie et al. Proceedings of the 2001 IEEE Computer Society Conference on Computer Vision and Pattern Recognition, Dec. 2001.*

Siddiqui, Matheen, et al., "Efficient Articulated Model Fitting on a Single Image or a Sequence," The 16th IEEE International Symposium on Robot and Human Interactive Communication, Aug. 26-29, 2007, 6 pages.

Moschini, David, et al., "Tracking human motion with multiple cameras using an articulated model," MIRAGE '09 Proceedings of the 4th International Conference on Computer Vision/Computer Graphics Collaboration Techniques, May 2009, 12 pages.

Cohen, Isaac, et al., "3D Body Reconstruction for Immersive Interaction," Second International Workshop on Articulated Motion and Deformable Objects, Nov. 21-23, 2002, 12 pages.

Jim Rodgers, "Articulated Model Detection in Range Images," Stanford University, Jun. 14, 2006, 57 pages.

Gintautas Palubinskas, "Object Classifiers for Forest Classification," Institute of Mathematics and Informatics, obtained from the Internet [http://www.isprs.org/proceedings/XXIX/congress/part3/484_XXIX-part3.pdf], 1993, 4 pages.

Metaxas, Dimitri, "Shape and Nonrigid Motion Estimation through Physics-Based Synthesis," IEEE Transactions on Pattern Analysis and Machine Intelligence, vol. 15, No. 6, Jun. 1993, pp. 580-591.

Mikic, Ivana, et al., "Articulated Body Posture Estimation from Multi-Camera Voxel Data," Proceedings of the 2001 IEEE Computer Society Conference on Computer Vision and Pattern Recognition, Dec. 2001, 6 pages.

Shimada, N., et al., "Model Adaptation and Posture Estimation of Moving Articulated Object Using Monocular Camera," AMDO 2000 Proceedings of the First International WOrkshop on Articulated Motion and Deformable Objects, Sep. 2000, 12 pages.

Knoop, Steffen, et al., "A Human Body Model for Articulated 3D Pose Tracking," Humanoid Robots: New Developments, Jun. 2007, pp. 505-520.

Huang, Kuang-Man, et al., "Using Articulated Models for Tracking Multiple C. elegans in Physical Contact," Journal of Signal Processing Systems, vol. 55, Nos. 1-3, Apr. 3, 2008, 14 pages.

Athitsos, Vassilis, et al., "Estimating 3D Hand Pose from a Cluttered Image," Boston University Computer Science Tech. Report No. 2003-009 to appear in Proc. IEEE CVPR, Jun. 2003, 8 pages.

De La Gorce, Martin, et al., "Model-Based Hand Tracking with Texture, Shading and Self-occlusions," Proc. IEEE Conference on Computer Vision and Pattern Recognition, Jun. 2008, 8 pages.

Horn, Berthold, K.P., "Closed-form solution of absolute orientation using unit quaternions," reprinted from Journal of the Optical Society of America A., vol. 4, Apr. 1987, 14 pages.

"Relevant Hand Anatomy," retrieved from http://www.joint-pain-expert.net/hand-anatomy.html, May 17, 2011, 4 pages.

Balan, Alexandru, "Restricted Affine Registration of 3D Point Clouds," Defensive Publication, Jun. 7, 2011, 4 pages.

* cited by examiner

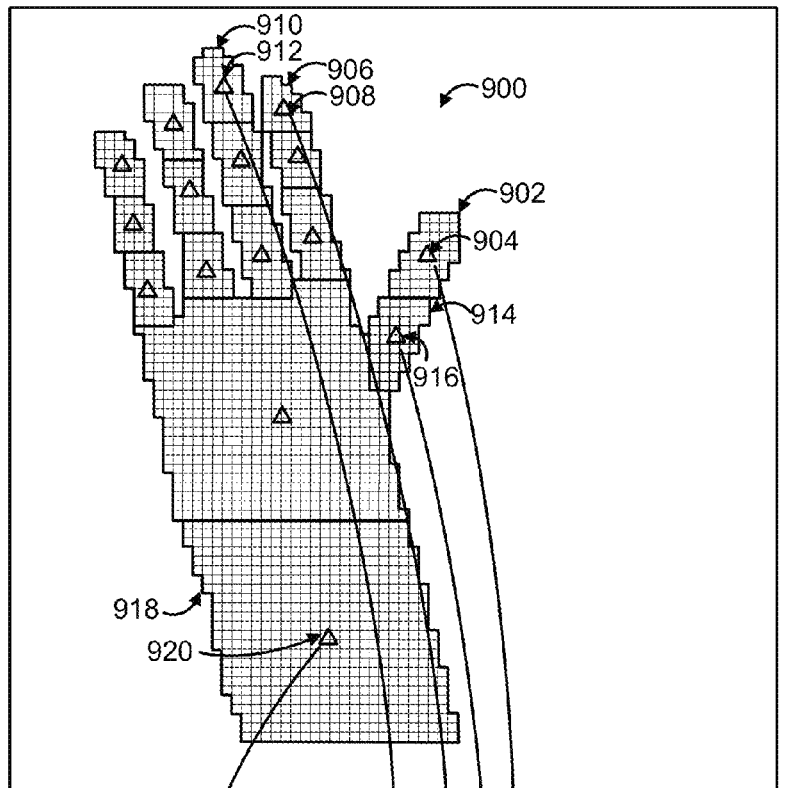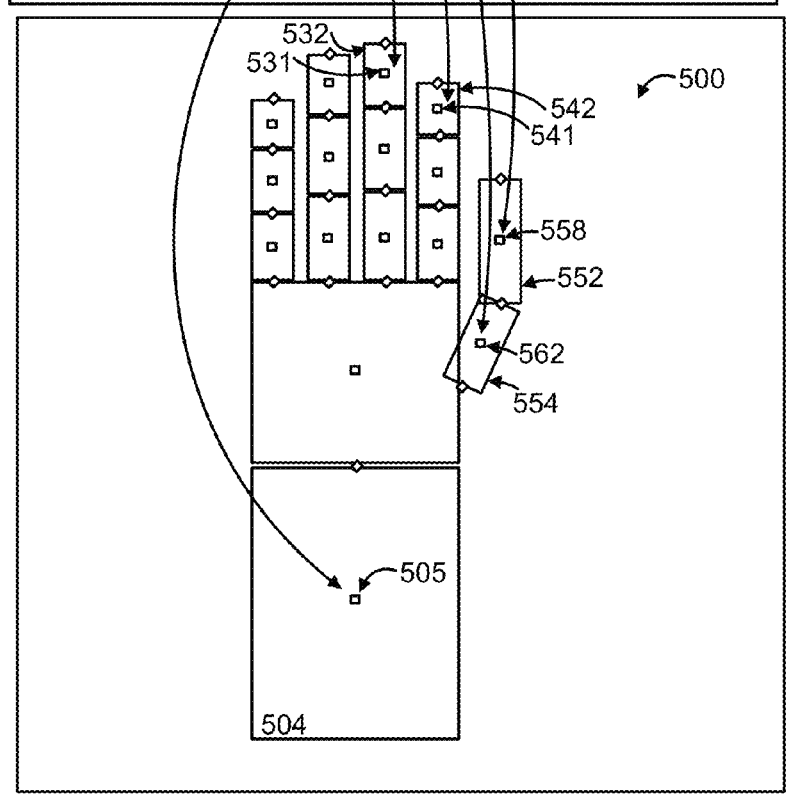
Fig. 11

PROBABILISTIC AND CONSTRAINT BASED ARTICULATED MODEL FITTING

CLAIM OF PRIORITY

This application is a continuation application of co-pending U.S. patent application Ser. No. 13/172,241, entitled "PROBABILISTIC AND CONSTRAINT BASED ARTICULATED MODEL FITTING," by Lee et al., filed Jun. 29, 2011, incorporated herein by reference in its entirety.

BACKGROUND

Imaging systems obtain data regarding the location, pose and/or movement of an articulated object such as a human or other subject/in a physical space, and can use the data as an input to an application in a computing system. Many applications are possible, such as for military, entertainment, sports and medical purposes. For instance, the pose and/or motion of an object can be used to control an animated character or avatar, to participate in a game, to make a selection from an on-screen menu of commands and so forth. A pose can represent a configuration or shape of the object at a point in time, such as in a frame of depth pixels, while the motion of an object can be represented by a sequence of poses, such as in multiple frames of depth pixels. Imaging systems can include optical systems which use cameras to detect the presence of an object in a field of view. However, further refinements are needed to image an object with higher fidelity. In particular, it is desirable to image articulated body portions such as the hand with a high degree of fidelity.

SUMMARY

A processor-implemented method, imaging system and tangible computer readable storage device are provided for imaging articulated body portions with improved fidelity. For example, a user may make hand gestures to navigate a menu, interact in a browsing or shopping experience, choose a game to play, or access communication features such as sending a message to a friend. The pose and/or movement of the hand can control a cursor to select an item from an on-screen menu, or to control the movement of an avatar in a 3D virtual world. Generally, the hand location and pose can be detected and used as a control input to an application in an imaging system.

To enhance the ability of the imaging system to accurately identify articulated body portions, a model of the articulated body portions is provided. The model is matched to corresponding depth pixels which are obtained from a depth sensor. Specifically, attract points of the model are matched to centroids of the depth pixels, and a rigid transform of the model is performed, in an initial, relatively coarse matching process. This matching process is then refined in a non-rigid transform of the model, still using the centroids. A further refinement is provided in an iterative process by rasterizing the model to provide depth pixels of the model, and comparing these to the depth pixels of the one or more frames. Collision, distance and angle constraints are also imposed on the model. The iterations end when a stop criterion is met, e.g., based on a number of iterations, a computational time or a convergence criterion.

In one embodiment, a computer readable storage device having computer readable software embodied thereon is provided for programming at least one processor to perform a method for modeling a pose an object (such as a user/person, animal, robot, etc.) The method includes obtaining depth pixels of articulated body portions of the object in one or more frames. The depth pixels of the articulated body portions can be obtained using a depth sensor. These depth pixels are sensor data. The method further includes processing the depth pixels of the depth sensor to identify centroids of the articulated body portions. The centroids can be central points of different portions of the articulated body portions. The method further includes accessing a model. The model includes articulated body portions which correspond to the articulated body portions of the object, and which each have at least one representative attract point.

In one approach, the representative attract point of a model portion is also a centroid of the model portion. The method further includes matching the representative attract points to the centroids and performing a rigid transform of the model, e.g., without changing relative orientations of the articulated portions of the model, to match the model to the depth pixels of the depth sensor. The rigid transform can include translating, rotating and scaling of the model. Thus, each representative attract point of the model is associated with a corresponding centroid of the sensor data, in one approach. For instance, a representative attract point of a distal thumb segment of the model can be associated with a centroid of a distal thumb segment of the sensor data.

Different pixels of the sensor data can be associated with different body portions using an exemplar machine learning process. In this approach, each depth pixel of the sensor data is assigned a probability for each body portion, indicating a probability that the depth pixel is part of the body portion. A depth pixel can be associated with a body portion for which the probability is the highest among all body portions.

In a refinement of the matching process which also uses the centroids, the method further includes changing the relative orientations of the articulated body portions of the model, to refine the match of the model to the depth pixels of the depth sensor, by refining the match of the representative attract points to the centroids. This can involve a non-rigid transform, which allows the body portions to move independently, such as by rotating about a joint.

In a further refinement of the matching process, which does not necessarily use the centroids, the method further includes performing multiple iterations, where each of the multiple iterations further refines the match of the model to the depth pixels of the depth sensor, by rasterizing the model to provide depth pixels of the model, and by adjusting the relative orientations of the articulated portions of the model based on a comparison between the depth pixels of the depth sensor and the depth pixels of the model. In particular, the comparison can identify three categories of pixels: (1) non-overlapping depth pixels of the depth sensor which are not overlapping in at least one comparison plane with the depth pixels of the model, (2) overlapping depth pixels of the depth sensor which are overlapping in at least one comparison plane with depth pixels of the model, and (3) non-overlapping depth pixels of the model which are not overlapping in at least one comparison plane with the depth pixels of the depth sensor. Adjustment vectors are determined based on the different categories of pixels and the respective pixel locations, and the model is refined based on the adjustment vectors. Each iteration can involve a non-rigid transform.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 11 depicts details of step 734 of FIG. 7A for centroid-to-attract point matching.

DETAILED DESCRIPTION

The techniques provided herein provide an estimate of the state (pose and/or shape) of articulated objects with high degrees of freedom in real-time through probabilistic information and constraints to generate a proposal that can be consumed as a source of input for various human-computer interaction tasks. The articulated objects can be known 3D shape objects with many joints that mostly have six degrees of freedom. The state is the translation, orientation, scale, and other shape descriptive information of all portions of the known articulated object.

Solutions to this problem for more limited cases such as full body tracking, where it is sufficient to identify features of the body such as the limbs and head, are typically insufficient when a finer level of detail is desired. For example, in detecting a user's hand, there may be a low degree of frame-to-frame coherency due to the user's ability to move the hand quickly across the pixel space. This is especially true when the user's hand fills a large portion of the field of view, such as when the user is close to the depth sensor. Moreover, compared to full body tracking, the hand generally has more ambiguity caused by self occlusions, and has many similar looking portions, e.g., fingers. However, the solutions provided herein are suitable as well for full body tracking and pose estimation.

A proposed solution generates real-time state proposals of a known articulated model observed by a depth sensor. The solution uses per-pixel probabilistic information generated by machine learning based classifiers, and known constraints about the articulated model, to aid the state estimation. A disambiguation step to distinguish similar looking body portions can also be used. The solution can be designed to be highly parallelizable to leverage modern hardware such as GPUs whenever possible. Features of the solution can include: (1) using a rigid transformation of 3D point clouds to coarsely match a model estimated at previous frame to current frame observations to deal with fast movement, (2) a scoring mechanism to match a centroid set to an articulated model, (3) a scoring mechanism to match a set of model locations to locations in a probability map, (4) a scoring mechanism to match each probability map pixel to a model location, (5) using the scoring mechanism of item (3) to calculate adjustments to move the model into a current location in a highly parallelizable way, and (6) using constraints to limit the proposed state to states that satisfy the known joint limits.

Figure 1:
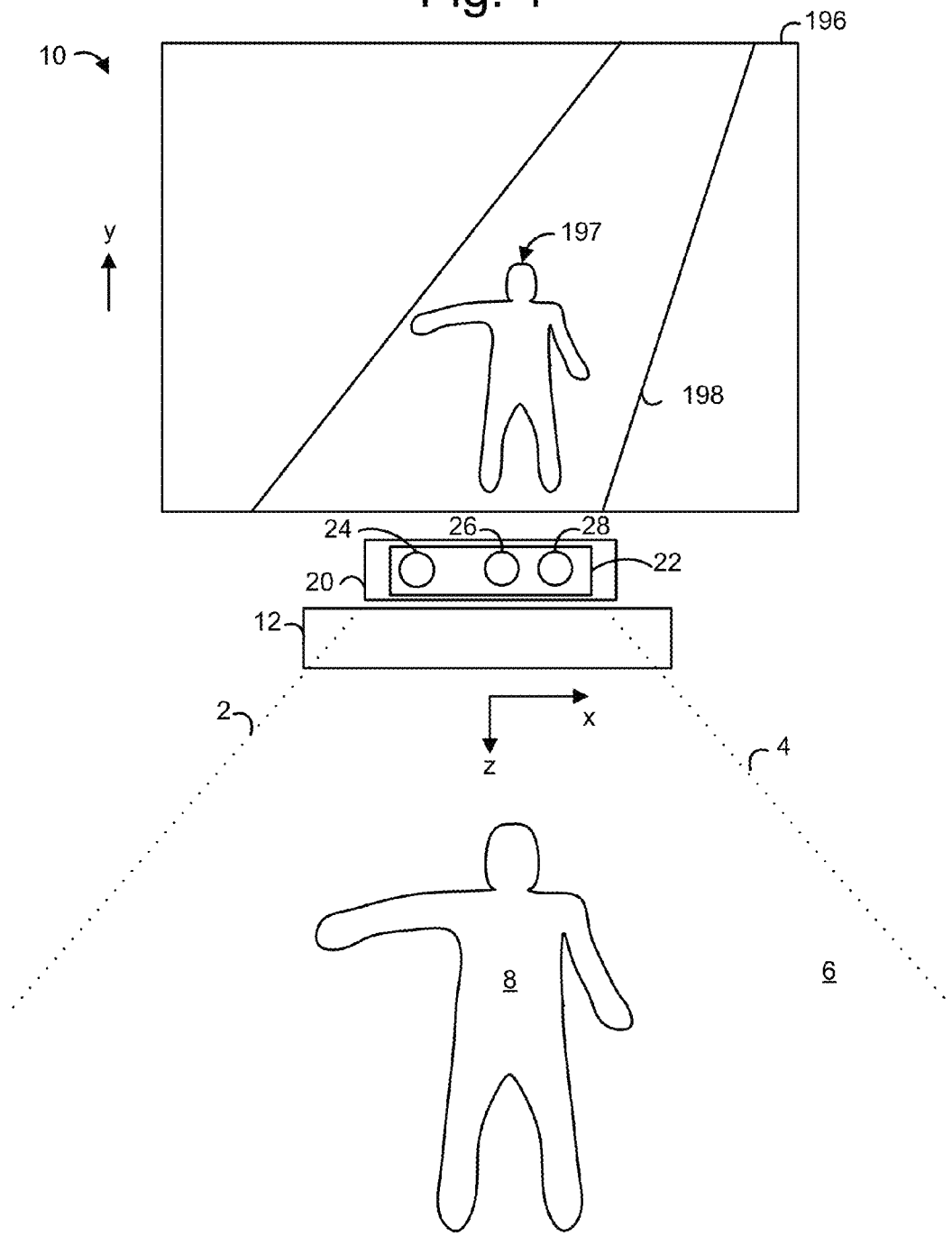
FIG. 1 depicts an example embodiment of an imaging system.

FIG. 1 depicts an example embodiment of an imaging system 10 in which a user 8 interacts with an application. This illustrates the real world deployment of an imaging system, such as in the home of a user. The imaging system 10 includes a display 196, a depth camera system 20, and a computing environment or apparatus 12. The depth camera system 20 may include an image camera component 22, or depth sensor, having an infrared (IR) light emitter 24, an infrared camera 26 and a red-green-blue (RGB) camera 28. The user 8, also referred to as a person or player, stands in a field of view 6 of the depth sensor. Lines 2 and 4 denote a boundary of the field of view 6. In this example, the depth camera system 20, and computing environment 12 provide an application in which an avatar 197 on the display 196 track the movements of the user 8. For example, the avatar may raise an arm when the user raises an arm. The user may also make gestures with the hand to provide control inputs to the application. The avatar 197 is standing on a road 198 in a 3D virtual world. A Cartesian world coordinate system may be defined which includes a z-axis which extends along the focal length of the depth camera system 20, e.g., horizontally, a y-axis which extends vertically, and an x-axis which extends laterally (transverse to the z-axis) and horizontally. Note that the perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the imaging system 10 is used to recognize, analyze, and/or track a human target. The computing environment 12 can include a computer, a gaming system or console, or the like, as well as hardware components and/or software components to execute applications.

The depth camera system 20 may include a camera which is used to visually monitor one or more people, such as the user 8, such that poses, gestures and/or movements performed by the user, including poses, gestures and/or movements of one or both hands, may be captured, analyzed, and tracked to perform one or more controls or actions within an application, such as animating an avatar or on-screen character or selecting a menu item in a user interface (UI). A hand pose represents a configuration of the user's hand at a point in time, such as in a frame of depth pixels, while a gesture represents a sequence of poses, such as in multiple frames of depth pixels. Multiple users can similarly be monitored.

The imaging system 10 may be connected to an audiovisual device such as the display 196, e.g., a television, a monitor, a high-definition television (HDTV), or the like, or even a projection on a wall or other surface that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The user 8 may be tracked using the depth camera system 20 such that the poses, gestures and/or movements of the user are captured and used to animate an avatar or on-screen character and/or interpreted as input controls to the application being executed by computer environment 12.

Some movements of the user 8 may be interpreted as controls that may correspond to actions other than controlling an avatar. For example, in one embodiment, the player may use poses and/or movements to end, pause, or save a game, select a level, view high scores, communicate with a friend, and so forth. The player may use poses and/or movements to select the game or other application from a main user interface, or to otherwise navigate a menu of options. Thus, a full range of poses and/or motion of the user 8 may be available, used, and analyzed in any suitable manner to interact with one or more applications.

The imaging system 10 may further be used to interpret target poses and/or movements as operating system and/or application control inputs that are outside the realm of games and other applications which are meant for entertainment and leisure. For example, virtually any controllable aspect of an operating system and/or application may be controlled by poses and/or movements of the user 8.

Figure 2:
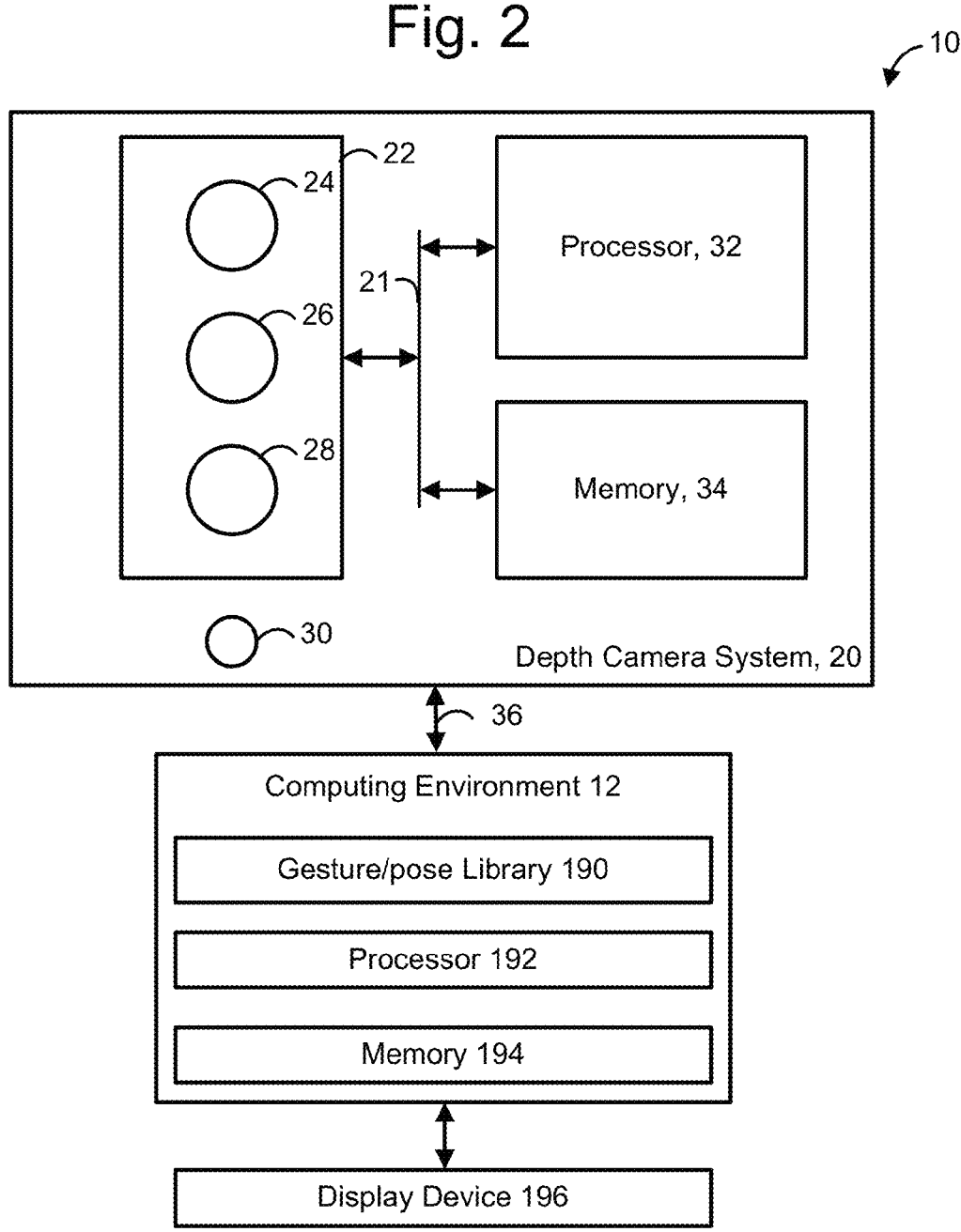
FIG. 2 depicts an example block diagram of the imaging system of FIG. 1.

FIG. 2 depicts an example block diagram of the imaging system 10 of FIG. 1a. The depth camera system 20 may be configured to capture video with depth information including a depth image that may include depth pixel values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2D) pixel area of the captured scene, where each pixel in the 2D pixel area has an associated depth value which represents a linear distance from the image camera component 22.

The image camera component 22 may include an infrared (IR) light emitter 24, an infrared camera 26, and a red-green-blue (RGB) camera 28 that may be used to capture the depth image of a scene. A 3D camera is formed by the combination of the infrared emitter 24 and the infrared camera 26. For example, in time-of-flight analysis, the IR light emitter 24 emits infrared light onto the physical space and the infrared camera 26 detects the backscattered light from the surface of one or more targets and objects in the physical space. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed in a known pattern such as grid pattern or a stripe pattern) may be projected onto the scene via, for example, the IR light emitter 24. Upon striking the surface of one or more targets or objects in the scene, the pattern may become deformed in response. Such a deformation of the pattern may be captured by, for example, the infrared camera 26 and/or the RGB camera 28 and may then be analyzed to determine a physical distance from the depth camera system to a particular location on the targets or objects.

The depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3D camera or RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3D camera 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gesture/pose library 190, such as a collection of gesture/pose filters, each having information concerning a gesture/pose that may be performed by a model (as the user poses or moves). For example, a gesture/pose filter can be provided for various hand poses and/or gestures. Example poses of the hand include holding the hand up with the palm facing forward, in a "stop" pose, holding up one or more fingers to indicate a quantity, and so forth. Example gestures of the hand include swiping or flinging of the hand. By comparing a detected pose or motion to each filter, a specified pose or gesture which is performed by a person can be identified.

The data captured by the depth camera system 20 in the form of a model may be compared to the gesture/pose filters in the gesture/pose library 190 to identify when a user (as represented by the skeletal model) has performed one or more specific poses or movements which are associated with various control inputs to an application.

The computing environment may also include a processor 192 for executing instructions which are stored in a memory 194 to provide audio-video output signals to the display device 196 and to achieve other functionality as described herein.

The memory 34 may be a tangible computer readable storage device having computer readable software embodied thereon for programming at least one processor to perform a method for modeling a pose of a hand or other articulated body portion of a user as described herein. Also, the processor 32 can be one or more processors which provide a processor-implemented method for modeling a pose of a user, where the method comprises processor-implemented steps as described herein.

Figure 3:
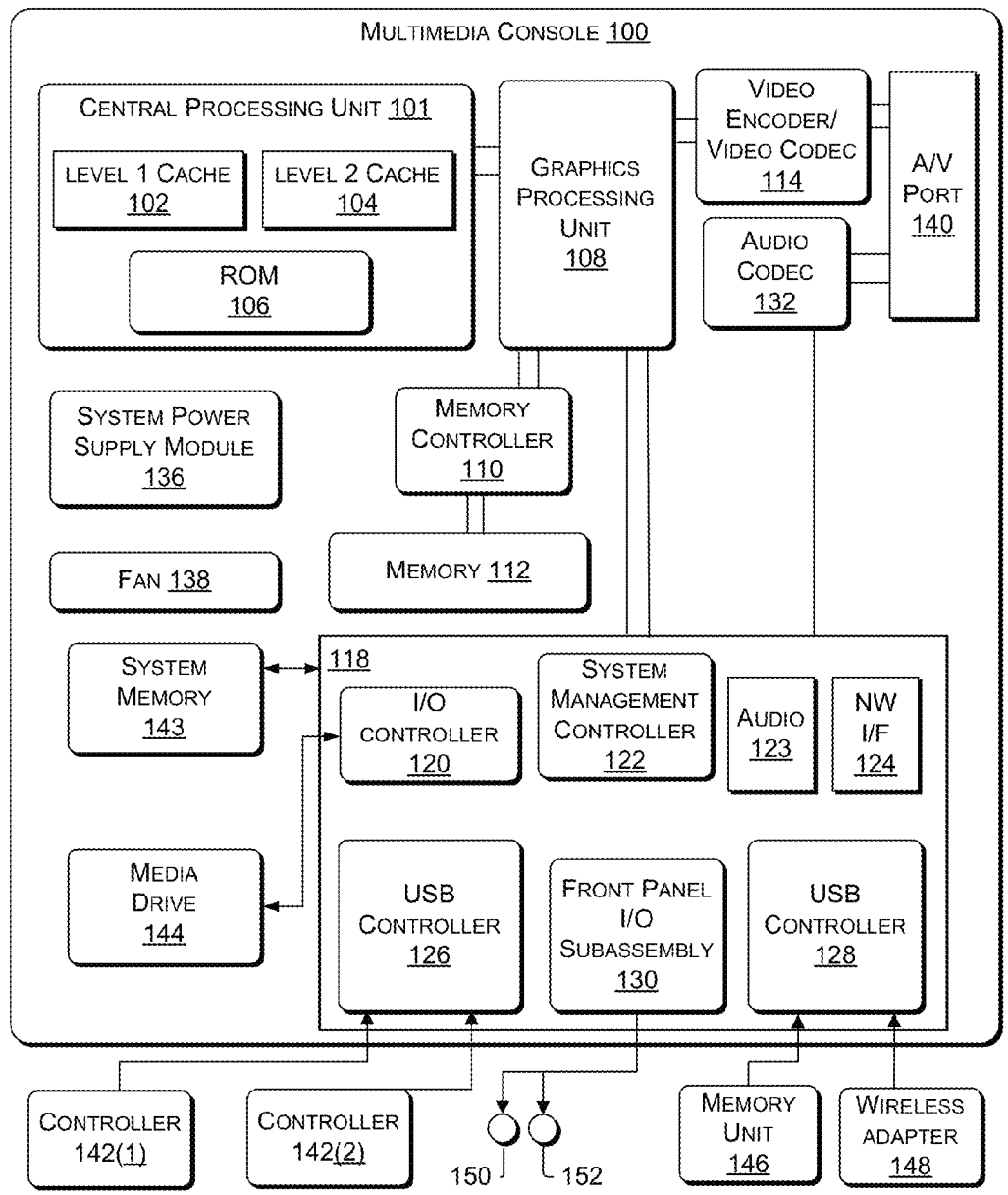
FIG. 3 depicts an example block diagram of a computing environment that may be used in the imaging system of FIG. 1.

FIG. 3 depicts an example block diagram of a computing environment that may be used in the imaging system of FIG. 1. The computing environment can be used to interpret one or more gestures or other movements and, in response, update a visual space on a display. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
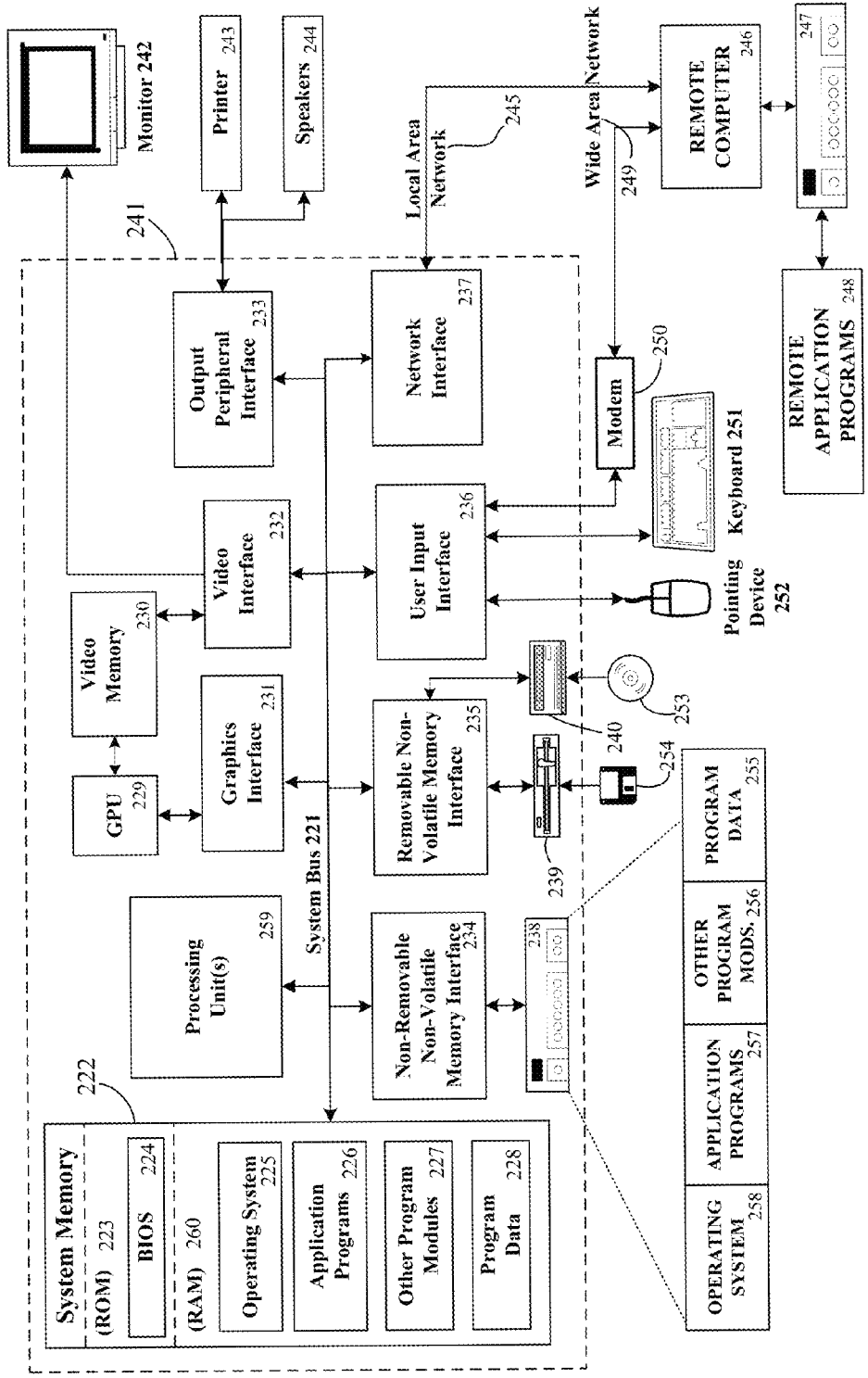
FIG. 4 depicts another example block diagram of a computing environment that may be used in the imaging system of FIG. 1.

FIG. 4 depicts another example block diagram of a computing environment that may be used in the imaging system of FIG. 1.

In an imaging system, the computing environment can be used to interpret one or more gestures or poses and, in response, update a visual space on a display. The computing environment 220 comprises a computer 241, which typically includes a variety of tangible computer readable storage media or devices. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media or device that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

The computing environment can include a tangible computer readable storage device having computer readable software embodied thereon for programming at least one processor to perform a method for modeling a pose of a hand or other articulated body portion of a user as described herein. The tangible computer readable storage device can include, e.g., one or more of components 222, 234, 235, 230, 253 and 254. Further, one or more processors of the computing environment can provide a processor-implemented method for modeling a pose of a hand or other articulated body portion of a user, where the method comprises processor-implemented steps as described herein. A processor can include, e.g., one or more of components 229 and 259.

Figure 5:
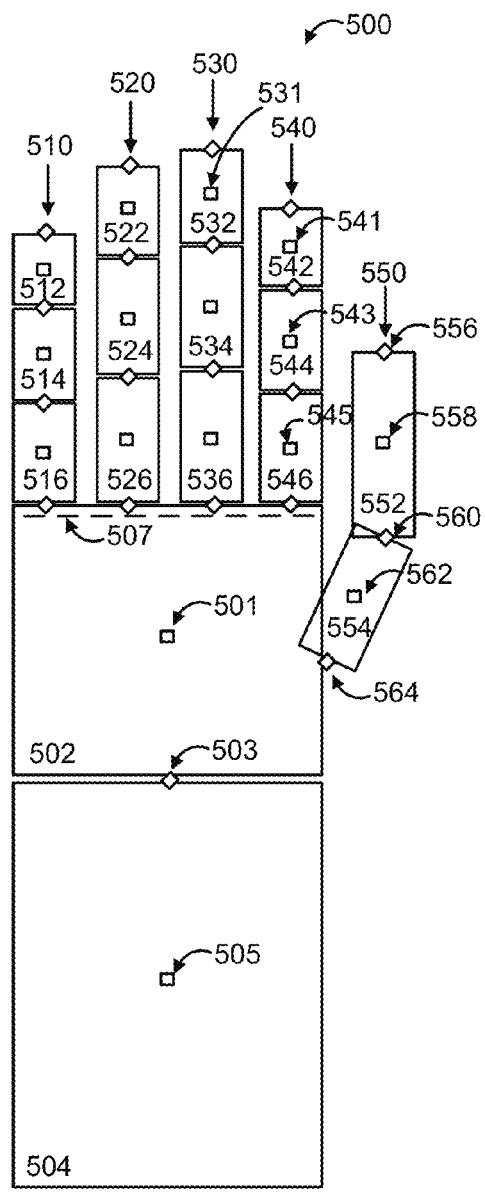
FIG. 5 depicts a model of a user's hand, including joints and attract points.

FIG. 5 depicts a model of a user's hand, including joints (depicted by diamonds) and attract points (depicted by squares). A model can be provided for predetermined articulated body portions for which a pose is to be detected. In one approach, a model of the hand area is provided. The model 500 can include an arm 504, palm 502, fingers 510, 520, 530 and 540 and thumb 550. The fingers include distal segments 512, 522, 532 and 542, middle segments 514, 524, 534 and 544, and proximal segments 516, 526, 536 and 546. The thumb includes a distal segment 552 and a proximal segment 554. The finger and thumb segments of the model correspond to the phalanx bones in the human body. Joints are provided between adjacent body portions, such as the joint 503 between the arm/wrist and palm, the joint 560 between the distal thumb portion and the proximal thumb portion and the joint 564 between the proximal thumb portion and the palm. These joints generally correspond to joints in the human body which have a defined range of movement. This movement is mainly angular but can be translational as well. Additional points such as on the fingertips (the tips of the distal finger segments and the distal thumb segment) can be used to define the location of the distal finger segments. For convenience, these tip points will also be referred to as "joints" even though they do not correspond to joints in the human skeleton. Joint 556 on the distal thumb segment is an example. Thus, some joints may not correspond to a joint in the human skeleton, such as joint 556, and some joints do correspond to a joint in the human skeleton, such as the joints 560 and 564. The orientation of a body portion can be defined by the positions of at least two joints of the body portion. For elongated body portions such as finger segments, the joints may be at opposing ends of the body portions, for instance.

Furthermore, one or more representative attract points can be designated for each body portion. For example, example representative attract points 531, 541, 558, 562, 501 and 505 are provided for the distal finger segment of the finger 530, the distal finger segment of the finger 540, the distal thumb portion 552, the proximal thumb portion 554, the palm 502 and the arm 504, respectively. Multiple attract points could be used as well, e.g., for a body portion which is relatively large and/or which has a relatively more complex range of movement, such as the palm. Attract points 543 and 545 are provided for the middle and proximal finger segments, respectively, of the finger 540.

It is also possible for one or more of the body portions of the model to have zero attract points.

Generally, in this and other figures, a small square shape denotes a representative attract point. A representative attract point can be a point that represents a body portion of the model. The term "attract point" indicates that in a matching process, the attract point is moved toward, or attracted to, depth sensor data. In one approach, the representative attract point is at a central point, or centroid, of the body portion. The centroid can be within the body portion or at a surface of the body portion. The surface can face the depth camera, along the depth axis or along a line of sight to the depth camera. The centroid can be considered to be a central point of the body portion.

An axis of importance 507, discussed below in connection with step 734 of FIG. 7A, can be used for centroid-to-attract point matching.

The model can indicate allowable ranges of movement of the various body portions. Each body portion may have an allowable angular range of movement with respect to an adjacent body portion. For example, the proximal segment of each finger may have an allowable angular range of movement with respect to the palm, the middle segment of each finger may have an allowable angular range of movement with respect to the proximal segment of the finger, and so forth. These can be defined by angle constraints. Some relative translational movement of the body portions may also be allowed. Collision constraints can be provided which indicate that the different body portions cannot collide, e.g., be present, in whole or in part, in the same location at the same time.

The model can be defined such that the body portions are generally independent and free floating, but distance constraints can be set which favor configurations in which body portions which are supposed to be adjacent to one another are in fact adjacent. The adjacency can involve joints of the adjacent body portions being substantially at the same location. In this approach, each body portion can have a joint at its extremity which is substantially coincident with the joint at the extremity of an adjacent body portion. As an example, the joint 560 between the distal and proximal thumb portions could represent one joint which is at the distal end of the proximal thumb portion 554 and one joint which is at the proximal end of the distal thumb portion 552. An example of a violated distance constraint occurs when the distal and proximal thumb portions are separated from one another.

In another approach, there is one joint between the distal and proximal thumb portions, for instance, and a distance constraint is a distance between the joint and a parent joint. In this approach of the model, a mesh is placed at a parent joint pointing toward a child joint even if it is not long enough to reach there. A parent or child joint can be associated with a parent or child body portion, respectively. A child body portion can be a smaller body portion which extends from a larger body portion, such as a finger which extends from a palm, in one possible approach. Or, a child body portion can be a body portion which extends from another body portion in a specified direction, such as in a direction from the arm to the fingertips. For instance, the proximal thumb portion 554 could be a parent of the distal thumb portion 552.

The model of the body portions can have a desired level of detail. For example, instead of modeling the palm as a unitary entity, it could be modeled in further detail, such as by modeling the metacarpal bones and joints. The model can include discrete volumes/shapes such as rectangles, cubes, ellipsoids, spheres and so forth. These volumes can be sized and shaped to provide a desired level of granularity. Alternatively or additionally, the model can be represented by a mesh which forms a continuous surface that is rigged and skinned appropriately. Rigging and skinning refers to placing a skeleton inside a 3D mesh and mapping skeletal segments to the corresponding parts of the mesh to create a body portion that smoothly deforms if the skeleton is moved. The complexity of the model should account for factors such as the desired degree of realism and the available computational resources.

Moreover, while the hand of a human has been discussed as one example of articulated body portions, the concept can be extend to other articulated body portions of an object having a known range of movement. The object can include a living being/object such as a human or animal, or a robot or other non-living object. One or more such objects can be tracked concurrently. Moreover, when a depth sensor is used as part of an application, the human who is imaged by the depth sensor can be an active user/participant of the application, or a passive spectator.

Figure 6:
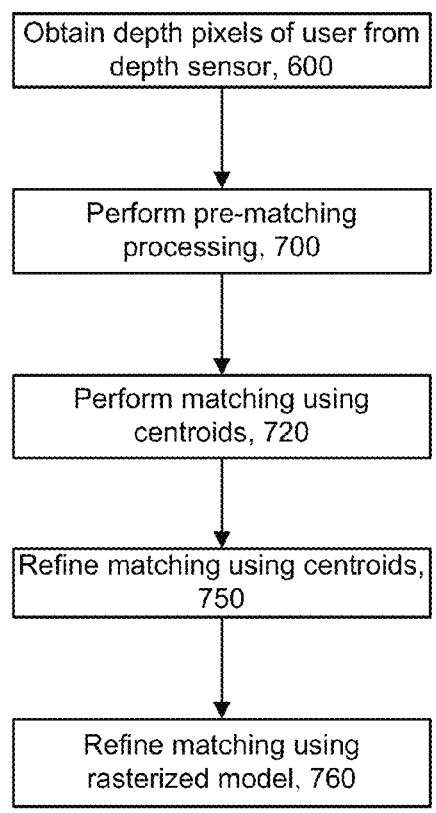
FIG. 6 depicts a method for detecting a pose of articulated body portions with improved fidelity in an imaging system.

FIG. 6 depicts a method for detecting a pose of articulated body portions with improved fidelity in an imaging system. Step 600 includes obtaining depth pixels of a user from a depth sensor, such as from the depth camera system mentioned previously. For example, this can be a frame of depth pixels. Step 700 includes performing pre-matching processing, such as described further in connection with steps 702-714 of FIG. 7A. Step 720 includes performing matching using centroids, such as described further in connection with steps 721-736 of FIG. 7A. Step 750 includes refining the matching using centroids, such as described further in connection with steps 752-756 of FIG. 7A. Step 760 includes refining the matching using a rasterized model, such as described further in connection with FIG. 7B. In one approach, steps 700, 720, 750 and 760 do not change the relative proportions of the body portions of the model.

Figure 7A:
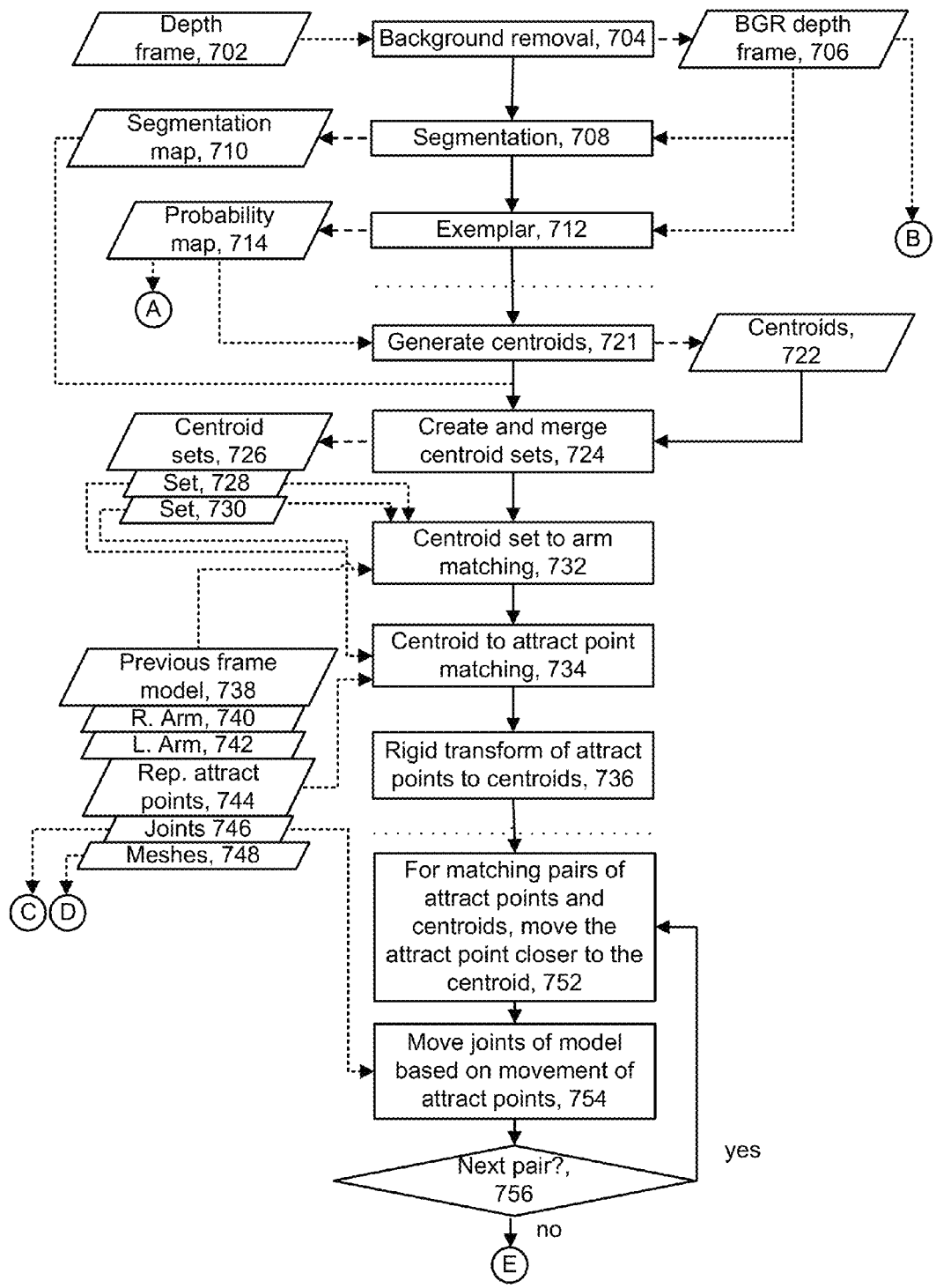
FIG. 7A depicts further details of steps 700, 720 and 750 of FIG. 6.
Figure 7B:
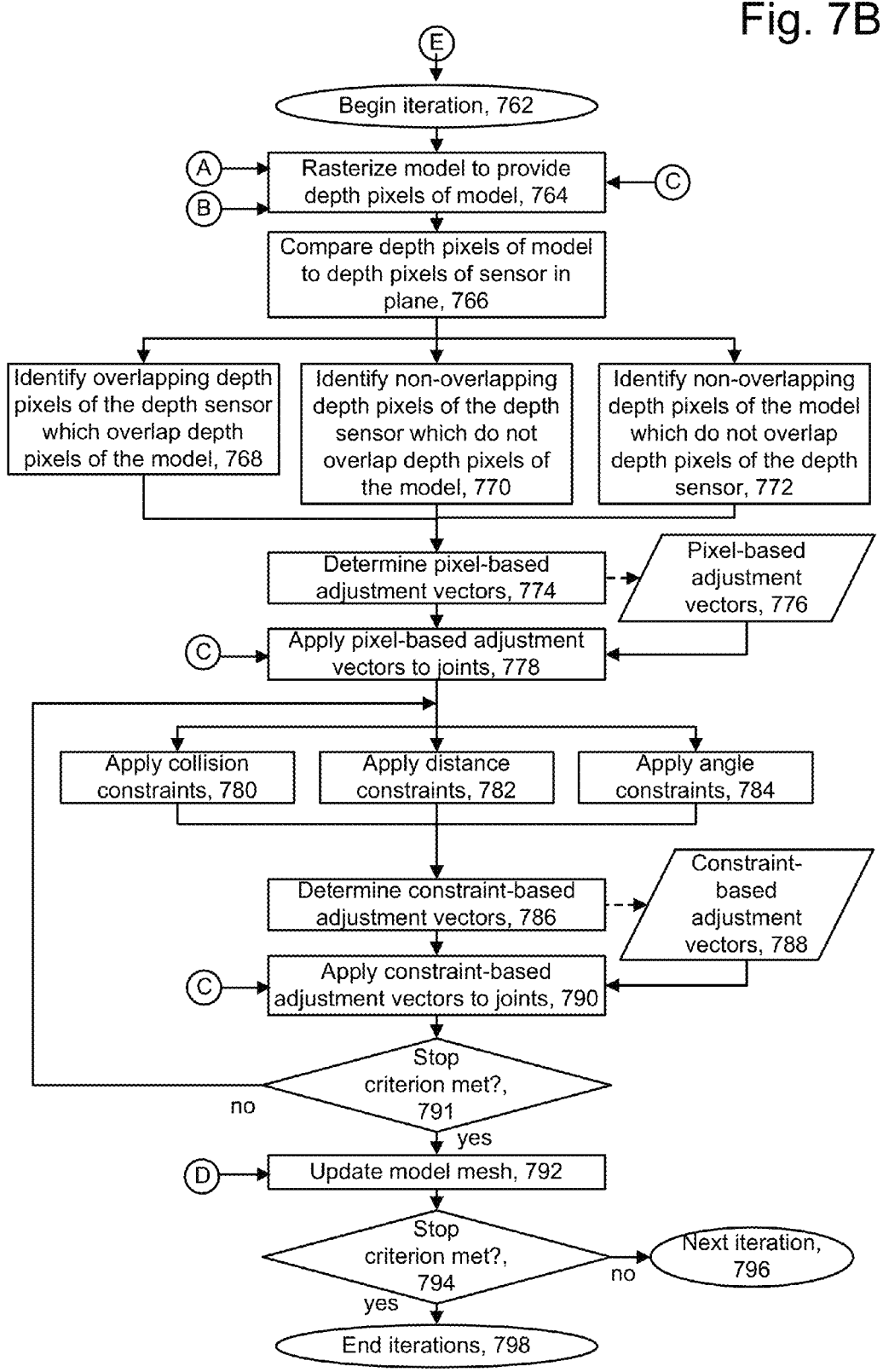
FIG. 7B depicts further details of step 760 of FIG. 6.

FIG. 7A depicts further details of steps 700, 720 and 750 of FIG. 6. In FIGS. 7A and 7B, the short-dashed lines (such as from 702 to 704) represent an input of data, the long-dashed lines (such as from 704 to 706) represent an output of data, and the solid lines (such as from 704 to 708) represent a code or software flow or execution sequence. Steps 702-714 correspond to step 700 in FIG. 7A for performing pre-matching processing.

Figure 8A:
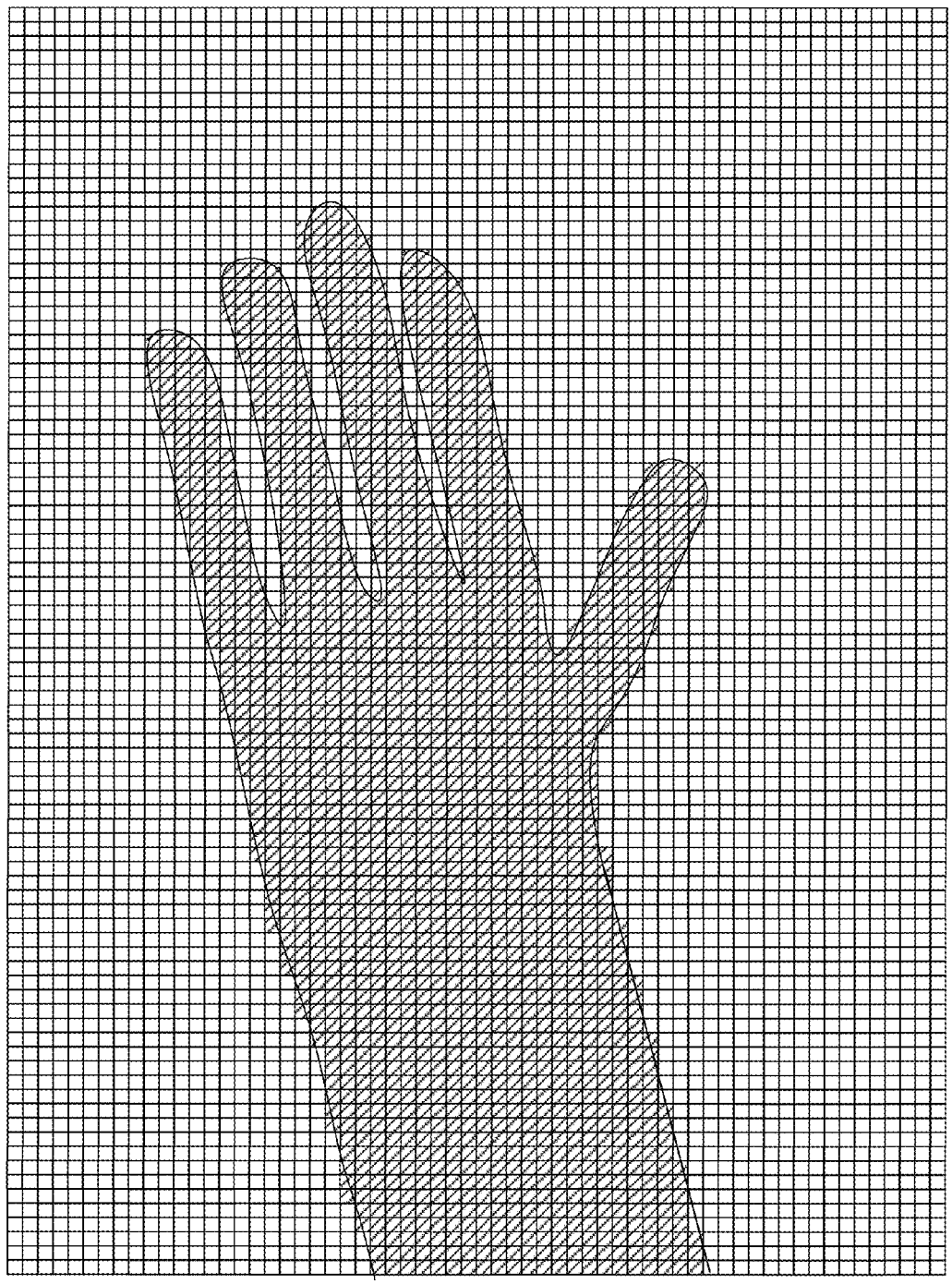
FIG. 8A depicts a frame of depth pixels, including depth pixels of a user's hand.

A background removal step 704 receives depth frame data 702 (such as frame 800 in FIG. 8A). The depth frame can include depth pixels from a depth sensor. The output can be a BGR (pixels in the color order of blue-green-red) depth frame 706, for instance (such as frame 810 in FIG. 8B). A segmentation step 708 processes the BGR depth frame to provide a segmentation map 710, which identifies the pixels as belonging to the right or left hand, if both hands are present. Various heuristics can be used for this purpose. An exemplar step 712 uses a machine learning process to process the BGR depth frame to provide a probability map 714. The machine learning process has been previously trained. Specifically, for each depth pixel, the probability that the depth pixel is part of one of the body portions can be determined. For example, Pr1 may be the probability that a depth pixel is part of the distal thumb portion, Pr2 may be the probability that the depth pixel is part of the proximal thumb portion, Pr3 may be the probability that the depth pixel is part of the palm, and so forth. For each pixel, the sum of its probabilities is one. Thus, the probability map can include a set of probabilities for each depth pixel, one for each body portion of the model.

Steps 721-736 correspond to step 720 in FIG. 7A. A step 721 generates centroids, one for each body portion, based on the probability map, to provide centroid data 722. The centroid data may be in the form of a 3D position in x, y, z coordinates for each of the body portions. The 3D position may or may not be coincident with a depth pixel. The centroid of each body part is a representative location of the body part, analogous to the representative attract point of the body part in the model. FIGS. 9A-9E and FIG. 10 depict example centroids. Step 724 creates and merges centroid sets to provide centroid set data 726. A centroid set is a collection of centroids that are determined to be part of the same modeled body region. For example, one set 728 can include centroids for one hand and another set 730 can include centroids for the other hand. At this point, it is not known whether a centroid set is associated with the right or left hand. Step 732 performs centroid set-to-arm matching using the centroids sets 728 and 730 as an input, and using the segmentation map. The segmentation map indicates which part of the depth map is the left versus the right hand. This step indicates which centroid set is associated with which arm. Various factors can be considered, such as how close a centroid set is from one arm versus the other. A centroid set which is closer to one arm is likely to be associated with that arm. This step can also use the previous frame model 738 (including right arm 740 and left arm 742 data) as an input, that is, the state of the model as determined from one or more previous frames, including the most recent frame.

Step 732 can involve bipartite matching between centroid sets and tracked articulated models based on scores calculated using distances between matching types of centroids and attract points, and confidence measures of the centroids, based on the probabilities.

Step 734 performs centroid-to-attract point matching. FIG. 11 provides further details. The centroid sets 728 and 730 and the representative attract points 744 (see FIG. 5) of the model can be provided as inputs. The representative attract point is the point in the articulated model which is ideally made to be coincident with the matching centroid of the depth sensor data, for each body portion. Step 734 can involve finding one or more best matches between all centroids in a centroid set and all attract points of a model using match scores calculated using various factors.

One factor involves distances between each matched centroid and attract point, which can be determined, e.g., by the magnitude of a vector which connects the centroid and the attract point. A higher score, associated with a higher likelihood of a proper match, can be assigned to a centroid which is closer to an attract point than to a centroid which is further from an attract point.

Another factor involves ordering of the centroids along an axis of importance. For example, for a model of the hand, the axis of importance can extend along the joints between the palm and the proximal segments of the fingers to indicate an expected order of the fingers, e.g., fingers 510, 520, 530 and 540 (from the bottom of the small finger to the bottom of the index finger). See the example axis of importance 507 in FIG. 5. The centroids can be projected along this axis, e.g., by moving the centroid in a direction which is orthogonal to the axis to determine where along the axis the centroid would fall. The projection of a point onto a line can be computed analytically in closed form. An order of the centroids along the axis can then be determined. Typically, the fingers are in the expected order, except perhaps if the fingers are crossed. A higher score, associated with a higher likelihood of a proper match, can be assigned to a centroid which is in the expected order along the axis of importance. A lower score, associated with a lower likelihood of a proper match, can be assigned to a centroid which is not in the expected order along the axis of importance. The axis of importance could be in another direction, and more than one axis of importance could be used as well.

Another factor involves connectivity with a neighboring centroid or body portion. For example, a centroid of the distal segment of finger is expected to be in a continuous pixel path with a centroid of the middle segment of the same finger, as opposed to a centroid of a segment of another finger. A higher score, associated with a higher likelihood of a proper match, can be assigned to a centroid which is in a continuous path with a centroid of an adjacent body portion. A lower score, associated with a lower likelihood of a proper match, can be assigned to a centroid which is not in a continuous path with a centroid of an adjacent body portion. This factor can be evaluated by figuratively walking the depth map in a direct line to determine if there are any disconnections in the pixel data. This factor can also be evaluated using more complex methods like path finding along the depth map between centroids with constraints on how much the path can diverge from a direct line to be more robust against noise and other edge cases. For example, if a gap in pixel data is detected in trying to walk from the distal segment of a finger to the middle segment of the same finger, this indicates the match is likely incorrect. That is, either one or both of the finger segments is not correctly identified. One can evaluate the connectivity by finding connections between the distal and middle finger centroids, for each finger, for instance.

Another factor involves collision checks between body portions of the model. A higher score, associated with a higher likelihood of a proper match, can be assigned to a centroid-to-attract point match which does not result in a collision, while a lower score, associated with a lower likelihood of a proper match, can be assigned to a centroid-to-attract point match which does result in a collision, where different body portions are present in the same location at the same time.

The best matches between the centroids and the attract points can be based on some combination of one or more of these or other factors. The different factors can be weighted differently based on their relative importance as determined, e.g., from test results.

Step 736 performs a rigid transform of attract points to centroids. See FIG. 12A for an example. A rigid transform can involve one or more of translating, rotating and scaling of the model. This step can include calculating the translation, rotation, and scaling of an optimal 3D point cloud transformation of the attract points, and applying the transformation to all attract points. Translation can include moving the model relative to a frame or coordinate system. The coordinate system can include arbitrary axes, such as orthogonal x, y and z axes (FIG. 1). Euler angles can be used to represent the transformation. Rotation can include rotating the model about one or more of the axes. Scaling changes the overall size of the model without changing the relative orientations or proportions of the body portions. In one approach, the rigid transform as a whole does not change the relative orientations of the body portions. The relative orientations of the body portions can be defined as the local transformation between a child body portion and its parent body portion. The child body portion can be a smaller body portion which extends from a larger body portion, such as a finger which extends from a palm, in one possible approach. An example of a rigid transform of a cube can result in a larger or smaller cube which is moved in 3D space from one location to another. An example of maintaining the relative orientations of body portions during a rigid transform is having a first finger which is three-fourths the length of the third finger, and having the first finger extend at a particular angle relative to the third finger, both before and after the rigid transformation.

An example implementation of the rigid transform computes a global scaling of the model uses a rigid transformation estimation between the attract points and the centroids. An example closed form computation of the rigid body transformation (rotation, translation and uniform scaling in all dimensions) between two corresponding point sets is described in Horn, B. K. P., "Closed-form solution of absolute orientation using unit quaternions," Journal of the Optical Society of America, 4(4), 629-642 (1987)," incorporated herein by reference. Horn states: "Finding the relationship between two coordinate systems using pairs of measurements of the coordinates of a number of points in both systems is a classic photogrammetric task. It finds applications in stereophotogrammetry and in robotics. I present here a closed-form solution to the least-squares problem for three or more points. Currently various empirical, graphical, and numerical iterative methods are in use. Derivation of the solution is simplified by use of unit quaternions to represent rotation. I emphasize a symmetry property that a solution to this problem ought to possess. The best translational offset is the difference between the centroid of the coordinates in one system and the rotated and scaled centroid of the coordinates in the other system. The best scale is equal to the ratio of the root-mean-square deviations of the coordinates in the two systems from their respective centroids. These exact results are to be preferred to approximate methods based on measurements of a few selected points. The unit quaternion representing the best rotation is the eigenvector associated with the most positive eigenvalue of a symmetric 4×4 matrix. The elements of this matrix are combinations of sums of products of corresponding coordinates of the points."

Another example implementation of a rigid transform is described in A. Balan, "Restricted Affine Registration of 3D Point Clouds," http://priorartdatabase.com/IPCOM/000207623, Jun. 7, 2011. This implementation computes a rigid transformation between centroids and attraction points, where one important feature is the ability to estimate different scaling parameters along the x-, y-, and z-axes of the model. It addresses the problem of registering a geometric model of an object to sensor observations, in terms of rotation, translation, and stretching, with independent stretches in different dimensions (width, height, length). This problem has applications in model fitting for object tracking and size estimation. The shapes are represented as collections of 3D surface points that are pair wise matched between the model and the sensor observations. It describes an iterative solution that computes a restricted affine transformation of the model points that minimizes the distance to the corresponding sensor measured points.

Steps 752-756 correspond to step 750 in FIG. 7A. Steps 752, 754 and 756 can be considered to be part of a centroid-to-attract point magnetism process. Step 752 involves, for matching pairs of attract points and centroids, moving the attract point closer to the centroid. See FIGS. 12A and 12B for an example, where a matching pair of an attract point and a centroid could include the attract point 562 of the proximal thumb portion 554 of the model and the centroid 916 of the depth sensor data, or the attract point 558 of the distal thumb portion 552 of the model and the centroid 904 of the depth sensor data.

Step 752 can include determining which of the transformed representative attract points obtained from step 736 are further than a respective threshold distance from a corresponding one of the centroids, and adjusting the transformed representative attract points which are further than the respective threshold distance from the corresponding one of the centroids, to be closer than the respective threshold distance from the corresponding one of the centroids. The respective threshold distance can be a tuned distance which is specific to each representative attract point, in one approach. Or, the respective threshold distance can be common to different representative attract points.

Step 754 involves moving the joints of the model based on movement of the attract points. Steps 752 and 754 can be performed together, since movement of the attract point is coincident with movement of one or more joints of the model. The movement of a joint can be affected by the movement of one or more attract points. The movement of a joint can be defined by a vector or force which defines the direction in 3D space, and the magnitude, of the movement. An input to step 754 is the joint data 746, which can define the position of each joint of the model in 3D space. At decision step 756, if there is a next pair of attract points, e.g., a next body portion, steps 752 and 754 are repeated. If decision step 756 is false, the process continues at a continuation point "E" in FIG. 7B. Mesh data 748 which represents a continuous surface of the model can also be provided based on the joint data 746.

In FIG. 7B, discussed next, the probability map is used as indicated by continuation point "A", the BGR depth frame is used as indicated by continuation point "B", the joint data 746 is used as indicated by continuation point "C" and the mesh data 748 is used as indicated by continuation point "D".

FIG. 7B depicts further details of step 760 of FIG. 6. The iterations refine the centroid-to-attract point match which was made previously, in FIG. 7A. In one approach, the iterations do not use the centroids of the depth sensor data, but use depth pixels obtained from a rasterization of the model. The depth pixels of the model are compared to depth pixels of the depth sensor to determine adjustment vectors to apply to the model, such as to the joints of the model. The model in its new state is rasterized in a next iteration and the process is repeated until a stop criterion is met.

Step 762 begins an iteration. Step 764 receives as inputs the probability map, BGR depth frame and joint data, and rasterizes the model to provide depth pixels of the model. For example, the mesh surface of the model can be rasterized in a three-dimensional (3-D) manner. In one approach, the depth pixels of the model are provided in a 2D buffer which provides data in the x-y plane and in a z-axis buffer which provides depth data along the z-axis. The depth pixels of the model are points in 3D space. Note that the rasterizing can be in any direction, which is the same or different than the depth pixels of the depth sensor, and not necessarily along the x and y axes. Further, the rasterizing can have the same resolution, or a finer or coarser resolution, than the depth pixels of the depth sensor. See pixels 1220 in FIG. 12C for an example of a pixels obtained by rasterizing a model of a hand.

Step 766 compares the depth pixels of the model to the depth pixels of the depth sensor in a comparison plane. In one approach, exemplified in FIGS. 13A and 13B, the plane is an x-y plane transverse/orthogonal to the depth axis. In another approach, the plane is transverse to a local line of sight of the depth sensor and is slightly offset from the transverse to the depth axis. The pixels are projected to the comparison plane in a direction which is transverse to the comparison plane, or are already at the comparison plane. The comparison plane can be anywhere between z>0 and a depth of a pixel of the model which is closest to the depth camera, in one approach. Three categories of pixels can be defined. Two of the categories are for the depth pixels of the depth sensor (steps 768 and 770) and one of the categories is for the depth pixels of the model (step 772).

Specifically, step 768 identifies overlapping depth pixels of the depth sensor which overlap depth pixels of the model. The term "overlap" indicates that the pixels occupy the same area, at least in part, in the comparison plane. Pixels 1230 in FIG. 12D are an example. A minimum degree of overlap between pixels may be defined which is sufficient to label pixels as overlapping. These are depth pixels of the depth sensor which are present approximately where the model is (in other words, the model is present where this depth sensor data is), indicating the model is a good fit to this depth sensor data.

Step 770 identifies non-overlapping depth pixels of the depth sensor which do not overlap depth pixels of the model. Pixels 1240 in FIG. 12D are an example. These are depth pixels of the depth sensor which are present approximately where the model is not (in other words, the model is not present where this depth sensor data is), indicating the model should be adjusted to better fit this depth sensor data.

Step 772 identifies non-overlapping depth pixels of the model which do not overlap depth pixels of the depth sensor. Pixels 1220 in FIG. 12D are an example. These are depth pixels of the model which are present approximately where the depth sensor data is not (in other words, the model is present where the depth sensor data is not), indicating the model should be adjusted to better fit the depth sensor data.

Based on the comparisons, step 774 determines pixel-based adjustment vectors which are stored as data 776. 3D adjustment vectors can be calculated which tend to pull/adjust the model toward the pixels. Adjustment vectors can be generated based on each of the three pixels types, then summed to obtain an overall adjustment vector for a joint. The pixel-based adjustment vectors can be assigned different weights based on whether they are from step 768, 770 or 772. For example, depending on the characteristics of the depth sensor and the needs of the application, it may be desired to more heavily weight one of the adjustments. For instance, if lateral resolution is of highest concern, the adjustment of step 770 and/or 772 may be more heavily weighted. If depth resolution is of highest concern, the adjustment of step 768 may be more heavily weighted.

For each of the three types of pixels, the adjustment vector can adjust a joint of the model which is identified as being an optimal joint to adjust. This optimal joint is not necessarily the joint that is closest to the pixel. The optimal joint can be identified by calculating scores for the different joints of the model based on a distance of the joint from the pixel. A joint which is closer to the pixel has a higher score and a higher probability of being selected. A joint which is further from the pixel has a lower score and a lower probability of being selected.

In one approach, for a non-overlapping or overlapping depth pixel of the depth sensor, the score can also be based on the probabilities associated with the pixel from the probability map (e.g., Pr1, Pr2, Pr3, . . . discussed previously). A joint which is associated with the same body portion for which the pixel has a relatively high probability of being associated with, has a higher score and a higher probability of being selected. The score can be higher in proportion to the probability of association. A joint which is associated with a different body portion for which the pixel has a relatively high probability of being associated with, has a lower score and a lower probability of being selected.

Figure 13A:
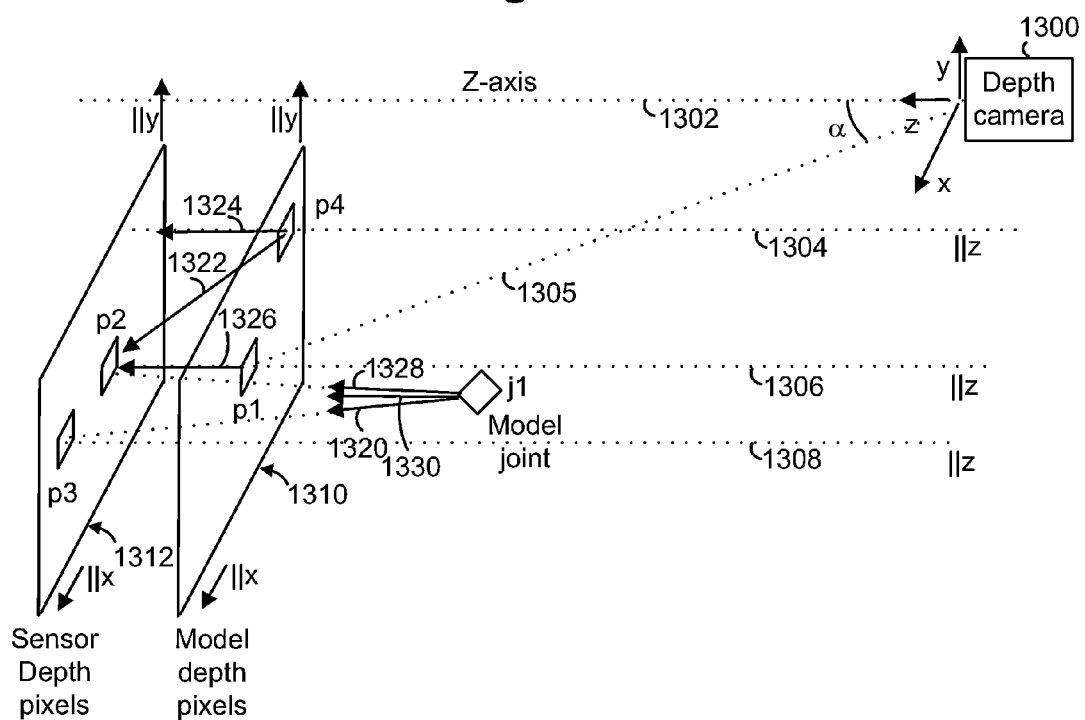
FIG. 13A depicts further details of steps 768, 770 and 772 of FIG. 7B for comparing depth pixels of a model to depth pixels of a sensor, where a comparison plane is transverse to a depth axis of a depth sensor.
Figure 13B:
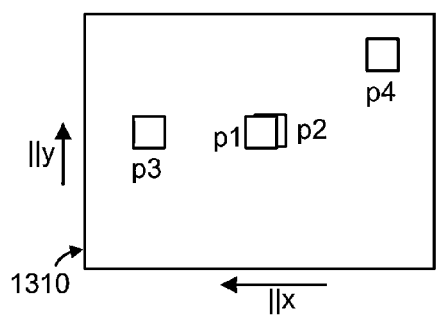
FIG. 13B depicts further details of the comparison plane 1310 of FIG. 13A.

Adjustment vector 1320 in FIG. 13A is an example adjustment vector for a non-overlapping depth pixel of the depth sensor. The vector extends in a direction from a joint j1 to the non-overlapping depth pixel of the depth sensor p3. For an overlapping depth pixel of the depth sensor, an adjustment vector can be determined in the same way as for a non-overlapping depth pixel of the depth sensor.

An adjustment vector will have components which depend on the direction of movement of the body portion. For example, if the body portion is moved primarily away from the depth sensor in the z direction, the adjustment vector will have a largest component in the z direction. If the body portion is moved primarily in the x-y plane, the adjustment vector will have one or more largest components in the x-y plane.

In one approach, the adjustment vector extends from a best match joint to the pixel. Adjustment vector 1328 in FIG. 13A is an example. The vector extends in a direction from a joint j1 to the overlapping depth pixel of the depth sensor p2. The same joint j1 is considered to be the best match joint in this example, but different best match joints could be associated with the non-overlapping depth pixel of the depth sensor and with the overlapping depth pixel of the depth sensor. In another approach, the adjustment vector extends from the overlapped depth pixel of the model to the overlapping depth pixel of the depth sensor. For example, adjustment vector 1326 in FIG. 13A extends in a direction from the overlapping depth pixel p1 of the model to the overlapping depth pixel of the depth sensor p2, essentially along the depth axis. In this case, the vector 1326 can be translated to a vector 1330 which acts on the joint j1.

In one approach, there is an intermediate step of translating the best matching attract point, which translates all joints that are affected by that attract point. A vector/delta of a pixel can be applied to the joints with some tuned/adjusted power. Fully applying all deltas to a joint might cause the joint to fly away since many pixels affecting it may result in too large of a delta—usually an average of the deltas works.

In one approach, the vectors 1326 and 1330 are in the same direction and have the same magnitude. Although, this is rarely the case since there usually are significantly fewer joints than pixels. So, two overlapping pixels and joints aligning in a single line would not be common. An adjustment vector could also be based on an interpolation between vectors 1328 and 1330, for instance.

In one approach, the adjustment vector does not pull the model. Instead, it pulls the attract points, which in turn pull the affected joints. Then, the model is placed where it makes the most sense, on top of the joints. For example, a proximal finger segment can be placed so that the proximal part is at the joint that connects the palm and the finger, and the proximal finger segment is oriented toward the joint of the middle finger segment.

For adjustment vectors that are between the overlapping camera depth pixel and the model depth pixel, one can find the proper joint to move using that vector and accumulate the translation to that joint and subsequently average it out. This might only involve z direction adjustments. In another case, there is an adjustment vector between a depth pixel and a joint, which can also be accumulated and averaged. This might involve x, y and z direction adjustments. These adjustments can be combined as needed.

Thus, for the non-overlapping depth pixel of the depth sensor and the non-overlapping depth pixel of the model, one can calculate the force or adjustment the pixel needs to contribute to move a selected joint to where it should be.

For an overlapping depth pixel of the depth sensor, an adjustment vector can be determined by finding the best joint to move based on a score calculated from a distance from the pixel to the joint, similar to the non-overlapping depth pixel of the depth sensor and the non-overlapping depth pixel of the model. One can also calculate an adjustment which tends to move the joint in a position in which the non-overlapping depth pixels of the model are overlapped so that they become overlapping depth pixels of the depth sensor in a next iteration. However, this calculation is optimized over all non-overlapping depth pixels of the model, which can impose conflicting adjustment on a joint. For example, the arm of the model may be wider than the arm width indicated by the sensor data. In this case, an optimal solution can tend to equalize a number of the non-overlapping depth pixels of the model around a perimeter of the arm as at least one of the body portions.

In one approach, the adjustment vector extends from the non-overlapping depth pixel of the model to a closest depth pixel of the sensor data. Adjustment vector 1322 in FIG. 13A is an example, assuming pixel p2 is closest to a non-overlapping depth pixel of the model p4. The vector extends in a direction from p4 to p2. In another approach, the adjustment vector extends from p4 along the depth axis, such as toward a plane 1312 of the closest depth pixel of the sensor data, with a magnitude based on a distance between p4 and the plane 1312. Adjustment vector 1324 in FIG. 13A is an example. The vector 1322 or 1324 can be translated to a vector (not shown) which acts on the joint j1, assuming j1 is the best joint to move.

In FIG. 7B, step 778 applies the adjustment vectors to the joints, as discussed. An input to this step is the joint data 746. FIGS. 12E and 12F provide an example. Subsequently, one or more constraints can be applied, as discussed previously, such as collision constraints at step 780, distance constraints at step 782 and angle constraints at step 784. Step 786 determines constraint-based adjustment vectors, to provide corresponding constraint-based adjustment vector data 788. The constraint-based adjustment vectors can be assigned different weights based on their type. For example, collision constraints may receive a higher weight, distance constraints may receive a next-highest weight and angle constraints may receive a next-highest weight.

Step 790 applies the constraint-based adjustment vectors to the joints of the model. An input to this step is the joint data 746. Decision step 791 determines if a stop criterion is met, e.g., when a fixed number of passes are performed or when joint movements fall below a certain threshold. If decision step 791 is false, steps 780-790 are repeated. If decision step 791 is true, step 792 is reached. Thus, the constraints applied in steps 780-790 can go through multiple iterations to best satisfy all constraints simultaneously.

Step 792 updates the model mesh based on the adjustments of steps 780-790. Decision step 794 determines if a stop criterion is met. For example, the stop criterion can be based on one or more of: (a) the number of iterations performed, such that the iterations stop when a maximum allowable number of iterations are performed, (b) a converge criterion which is based on the magnitudes of the adjustment vectors, such as that the iterations stop when the magnitudes of the adjustment vectors are sufficiently small, below a threshold, and (c) a criterion which is based on an amount of computations performed, such that the iterations stop when a maximum allowable number of CPU cycles are consumed. If the stop criterion is not met at decision step 794, a next iteration is performed at step 796, proceeding to step 762. The rasterizing of step 764 is performed on the model as it exists in an adjusted state from the previous iteration. FIG. 12G provides an example of an adjusted state of the model. If decision step 794 is true, the iterations end at step 798. At this point, the model has been optimally adjusted and can be used by a higher level process/application, such a pose or gesture estimation library, as discussed previously. In one approach, the model is optimally adjusted for each frame of depth data and provided as a control input to an application.

Note that one or more depth frames can be processed at a time. A batch processing mode processes multiple depth frames at a time to allow information from the multiple frames to be used together. Adjustment vectors can be initially determined for each frame and then averaged or otherwise combined across the batch of frames, so that the averaged adjustment vectors are applied to the batch of frames.

In one approach, FIG. 7B changes the transformations (rotation and translation) of the body portions of the model but not the relative proportions. In another approach, the relative proportions are changed.

FIG. 8A depicts a frame of depth pixels 800, including depth pixels of a user's hand. The frame may be used as the depth frame data 702 of FIG. 7A. The frame may include one or both hands of a user, or one or more hands of multiple users. Other body portions of one or more users may be included as well. Essentially, the frame includes objects in the field of view of the depth sensor.

Figure 8B:
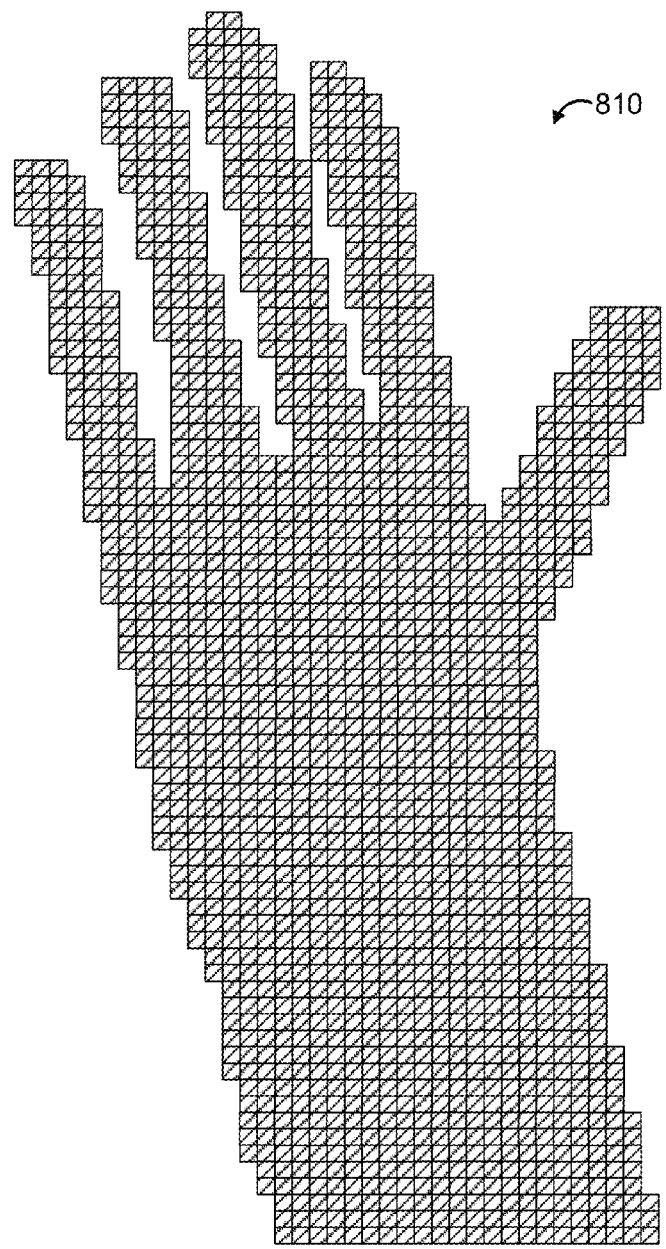
FIG. 8B depicts depth pixels of the user's hand of FIG. 8A, with background pixels removed.

FIG. 8B depicts depth pixels 810 of the user's hand of FIG. 8A, with background pixels removed. As discussed, the background removal step 704 of FIG. 7A receives depth frame data 702 (such as frame 800 in FIG. 8A) and removes the background pixels.

Figure 9A:
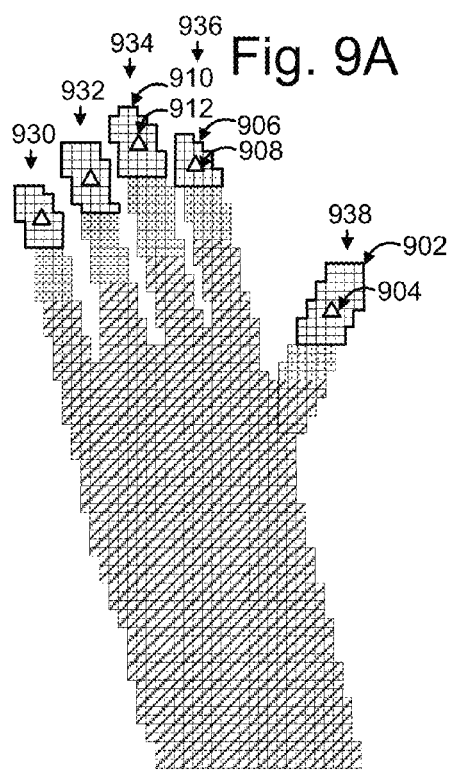
FIG. 9A depicts probability values from the exemplar step 712 of FIG. 7A for the distal finger segments and the distal thumb segment of the depth pixels of the user's hand of FIG. 8B.

FIG. 9A depicts probability values from the exemplar step 712 of FIG. 7A for the distal finger segments and the distal thumb segment of the depth pixels of the user's hand of FIG. 8B. This is a simplified graphical depiction in 2D of probability values. As mentioned, each pixel has a different probability value (Pr1, Pr2, Pr3, . . . ) relative to each body portion of the model indicating the likelihood that the pixel is part of that body portion. This figure depicts results together for five body portions. Each area of unshaded pixels which is outlined by a solid heavy line represents pixels having a highest probability of being part of the local body portion. The pixels with a dotted pattern have a lower probability of being part of the local body portion, and the pixels with a diagonal pattern have a lowest probability of being part of the local body portion. Further, each triangle represents a centroid of the depth pixels for a body portion. The body portions include the first or small finger 930, the second finger 932, the third finger 934, the fourth or index finger 936 and the thumb 938.

For example, for the third finger 934, the pixels in area 910 are assigned to the distal finger segment, and an associated centroid 912 is determined. For the fourth finger 936, the pixels in area 906 are assigned to the distal finger segment, and an associated centroid 908 is determined. For the thumb 938, the pixels in area 902 are assigned to the distal thumb segment, and an associated centroid 904 is determined.

The use of unshaded pixels, dotted pattern pixels and diagonal pattern pixels is consistent in FIGS. 9A-9E.

Figure 9B:
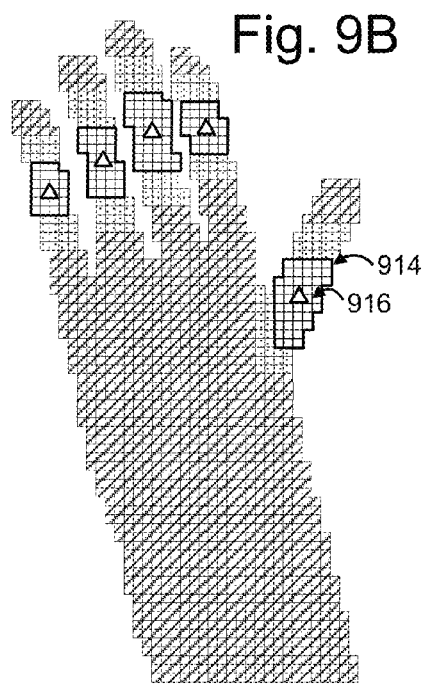
FIG. 9B depicts centroids generated in step 721 of FIG. 7A for the middle finger segments and the proximal thumb segment of the depth pixels of the user's hand of FIG. 8B.

FIG. 9B depicts centroids generated in step 721 of FIG. 7A for the middle finger segments and the proximal thumb segment of the depth pixels of the user's hand of FIG. 8B. For example, for the thumb, the pixels in area 914 are assigned to the proximal thumb segment, and a centroid 916 of the proximal thumb segment is determined.

Figure 9C:
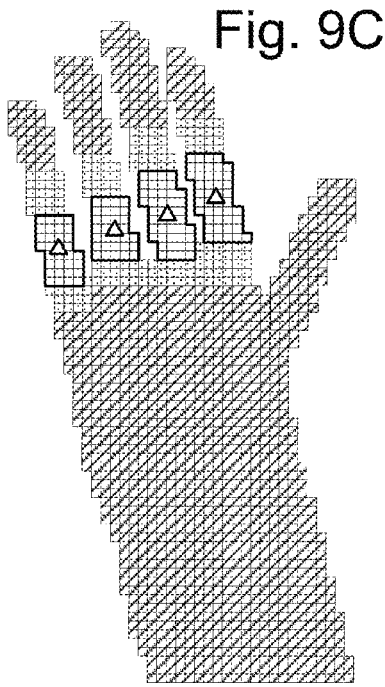
FIG. 9C depicts centroids generated in step 721 of FIG. 7A for the proximal finger segments of the depth pixels of the user's hand of FIG. 8B.

FIG. 9C depicts centroids generated in step 721 of FIG. 7A for the proximal finger segments of the depth pixels of the user's hand of FIG. 8B.

Figure 9D:
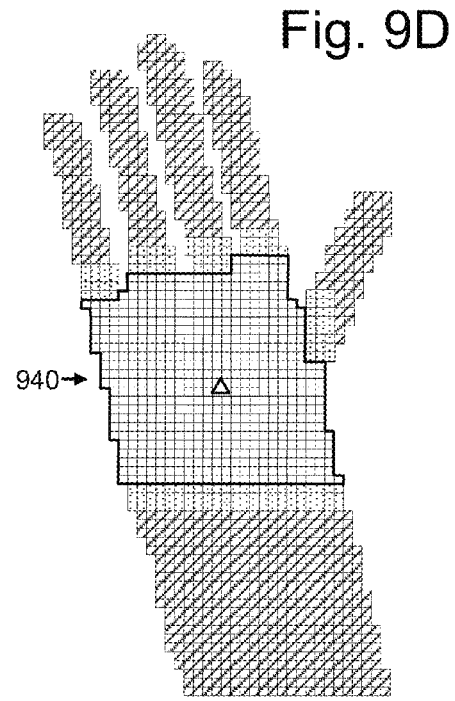
FIG. 9D depicts centroids generated in step 721 of FIG. 7A for the palm of the depth pixels of the user's hand of FIG. 8B.

FIG. 9D depicts centroids generated in step 721 of FIG. 7A for the palm 940 of the depth pixels of the user's hand of FIG. 8B.

Figure 9E:
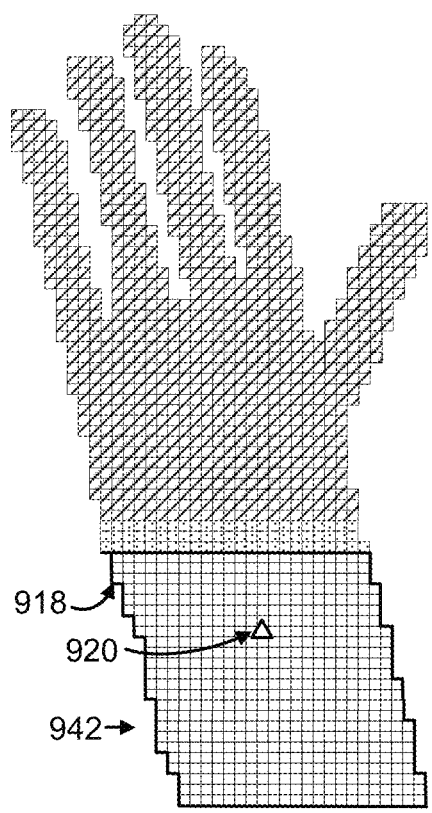
FIG. 9E depicts centroids generated in step 721 of FIG. 7A for the arm of the depth pixels of the user's hand of FIG. 8B.

FIG. 9E depicts centroids generated in step 721 of FIG. 7A for the arm 942 of the depth pixels of the user's hand of FIG. 8B.

Figure 10:
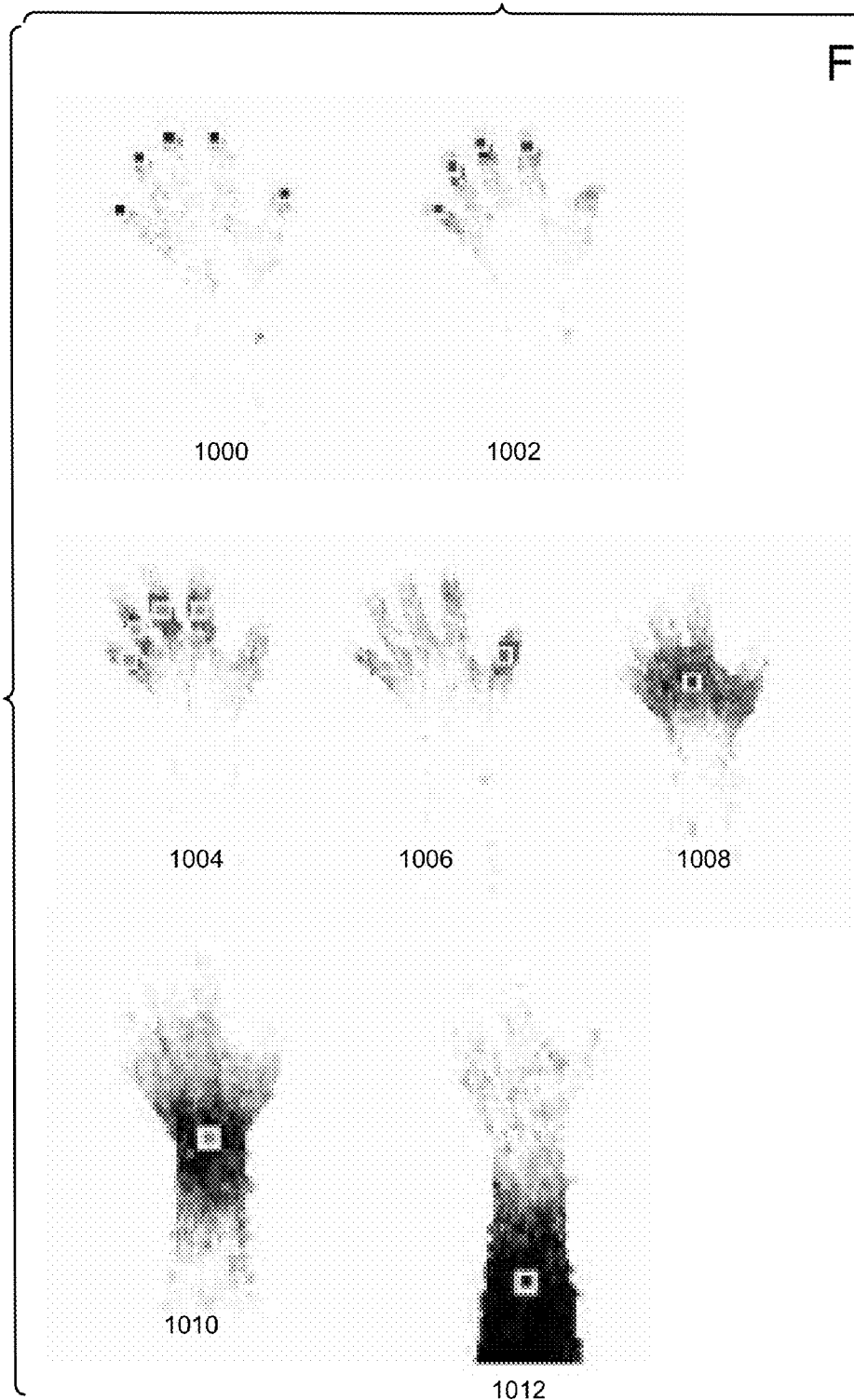
FIG. 10 depicts centroids generated in step 721 of FIG. 7A from test data of a user's hand.

FIG. 10 depicts centroids generated in step 721 of FIG. 7A from test data of a user's hand. Test data typically exhibits noise. In each image, a darker region corresponds to a higher probability. Further, a square represents a centroid. For example, image 1000 is for the distal finger and thumb segments. The dark regions are partially covered by the square icon of the centroids. Image 1002 is for the middle finger segments, image 1004 is for the proximal finger segments, image 1006 is for the proximal thumb segment, image 1008 is for the palm, image 1010 is for a lower portion of the forearm and image 1012 is for an upper portion of the forearm.

FIG. 11 depicts details of step 734 of FIG. 7A for centroid-to-attract point matching. As mentioned, each triangle represents a centroid of a respective body portion which is outlined in a solid heavy line. The pixel data 900 from the depth sensor is depicted, in addition to the model 500. As an example, for the pixels which represent the distal finger segment 910, the centroid 912 is matched to the attract point 531 of the corresponding distal finger segment 532 of the model 500. Similarly, for the pixels which represent the distal finger segment 906, the centroid 908 is matched to the attract point 541 of the corresponding distal finger segment 542 of the model 500. For the pixels which represent the distal thumb segment 902, the centroid 904 is matched to the attract point 558 of the corresponding distal thumb segment 552 of the model 500. For the pixels which represent the proximal thumb segment 914, the centroid 916 is matched to the attract point 562 of the corresponding proximal thumb segment 554 of the model 500. For the pixels which represent the arm 918, the centroid 920 is matched to the attract point 505 of the corresponding arm 504 of the model 500.

Each centroid can be matched to a respective attract point. In some cases, not all centroids can be identified and/or matched to a respective attract point, in which case the model is adjusted based on the information that is available. A decision can be made on a per-frame basis to not adjust the model if the available information is insufficient.

Figure 12A:
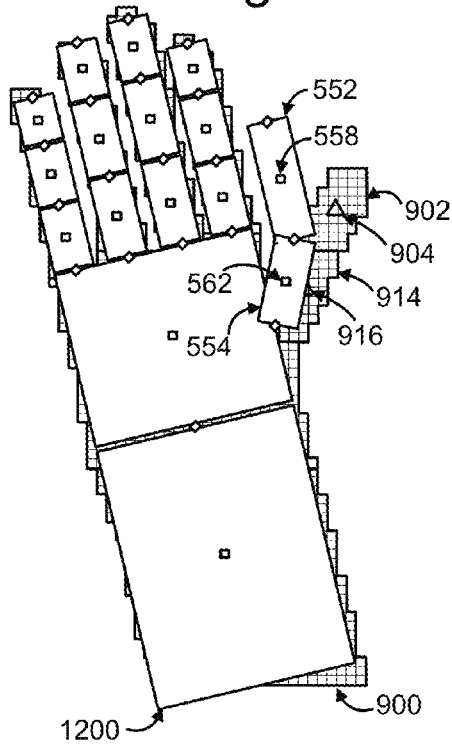
FIG. 12A depicts details of step 736 of FIG. 7A for a rigid transform of attract points to centroids.

FIG. 12A depicts details of step 736 of FIG. 7A for a rigid transform of attract points to centroids. The model 1200 is transformed to provide a best match of the attract points of the model to the centroids of the depth pixel data, across all attract points. In this example, the match of the model to the pixel data is fairly good, except for the thumb. In particular, the attract point 562 of the proximal segment of the thumb is somewhat spaced apart from the associated centroid 916, and the attract point 558 of the distal segment of the thumb is more significantly spaced apart from the associated centroid 904.

Figure 12B:
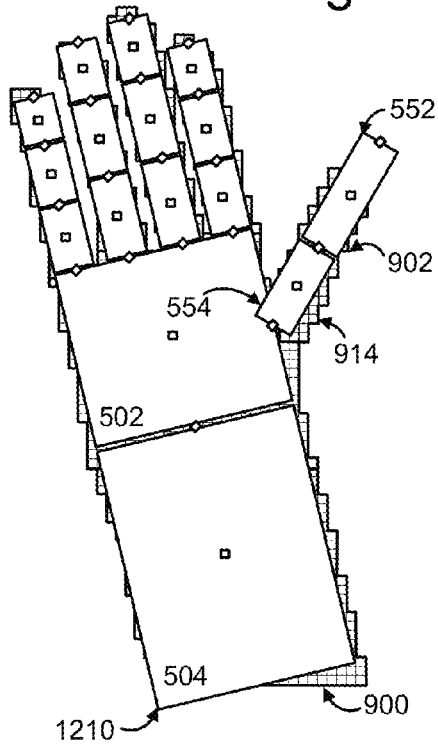
FIG. 12B depicts details of step 752 of FIG. 7A for moving an attract point closer to a centroid.

FIG. 12B depicts details of step 752 of FIG. 7A for moving an attract point closer to a centroid. Here, the model 1210 is refined so that attract point 562 is moved closer to the associated centroid 916, and the attract point 558 is moved closer to the associated centroid 904.

Figure 12C:
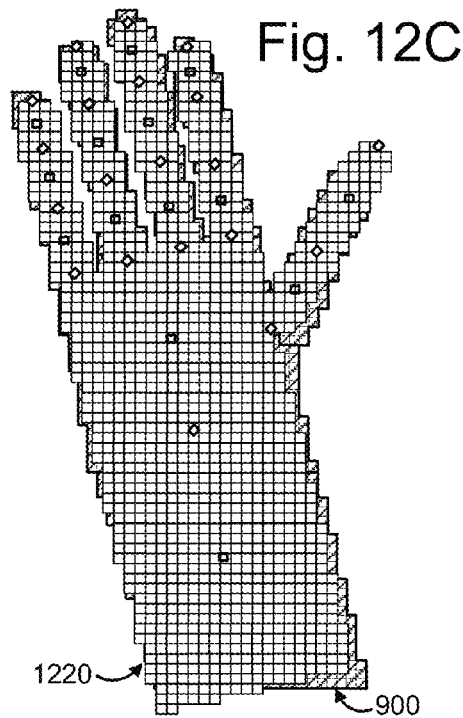
FIG. 12C depicts details of step 764 of FIG. 7B for rasterizing a model to provide depth pixels of the model.
Figure 12D:
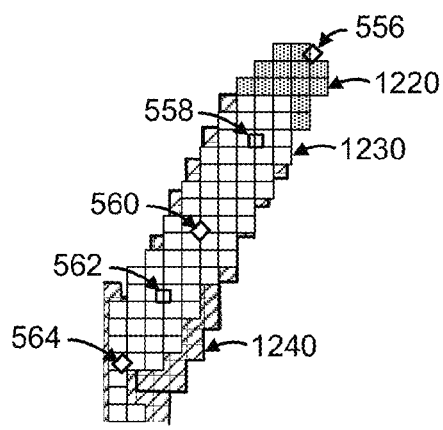
FIG. 12D depicts details of steps 766-772 of FIG. 7B for comparing depth pixels of a model to depth pixels of a sensor, for a thumb area.
Figure 12E:
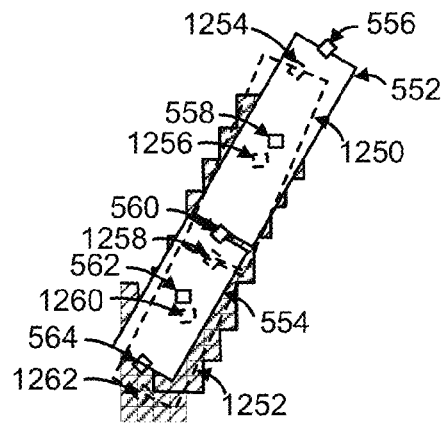
FIG. 12E depicts details of step 778 of FIG. 7B, showing the adjustment of the joints of the model based on pixel-based adjustment vectors, consistent with FIG. 12D.
Figure 12F:
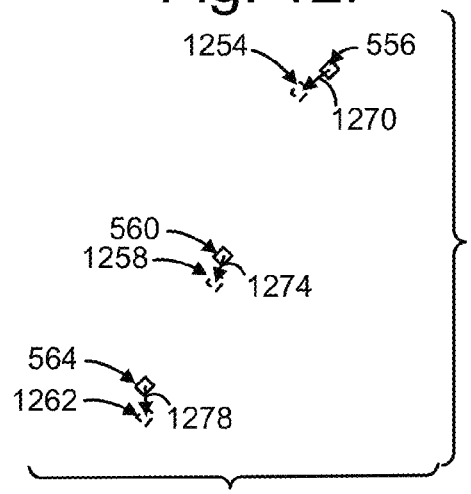
FIG. 12F depicts pixel-based adjustment vectors used in FIG. 12E.
Figure 12G:
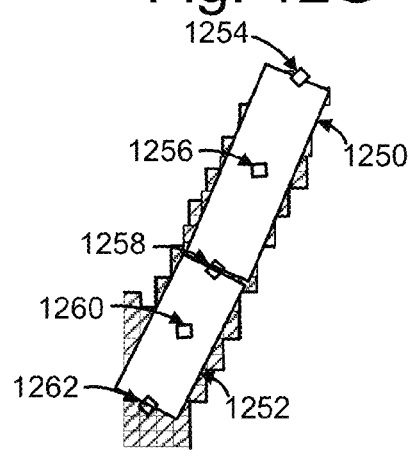
FIG. 12G depicts details of step 792 of FIG. 7B, showing the updating of a model, consistent with FIG. 12E.

FIG. 12C depicts details of step 764 of FIG. 7B for rasterizing a model to provide depth pixels 1220 of the model. These pixels are seen on top of the pixels 900 of the depth sensor, such as in a comparison plane. The pixels of the model are unshaded while the pixels 900 of the depth sensor have a diagonal pattern. The position of the proximal thumb segment is not optimal because there are more pixels of the depth sensor below, than above, the pixels of the model for the proximal thumb segment 554. Also, the position of the distal thumb segment is not optimal because there are more pixels of the depth sensor above, than below, the pixels of the model for the distal thumb segment 552. Similarly, the position of the arm 504 and palm 502 are not optimal as there are more pixels of the depth sensor to the right side than to the left, around the perimeter of the arm and palm. The refinement using rasterizing can identify these non-optimal conditions by allowing the pixel data of the model and of the depth sensor to be compared.

FIG. 12D depicts details of steps 766-772 of FIG. 7B for comparing depth pixels of a model to depth pixels of a sensor, for a thumb area. The thumb area of FIG. 12C is isolated to show detail. However, the comparison can be performed for all body portions of the model. An area 1230 of pixels which are unshaded represents the overlapping depth pixels of the depth sensor of step 768. An area 1240 of pixels which have a diagonal pattern represents the non-overlapping depth pixels of the depth sensor of step 770. An area 1220 of pixels which have a dotted pattern represents the non-overlapping depth pixels of the model of step 772.

FIG. 12E depicts details of step 778 of FIG. 7B, showing the adjustment of the joints of the model based on pixel-based adjustment vectors, consistent with FIG. 12D. The joint locations 564, 560 and 556 are adjusted to locations 1262, 1258 and 1254, respectively. As a result, the attract points similarly are adjusted from locations 562 and 558 to 1260 and 1256, respectively.

FIG. 12F depicts pixel-based adjustment vectors used in FIG. 12E. Adjustment vectors 1278, 1274 and 1270, respectively, are used to adjust the joint locations 564, 560 and 556 to locations 1262, 1258 and 1254, respectively. The adjustment vectors can be 3D but are depicted as 2D in this example for simplicity.

FIG. 12G depicts details of step 792 of FIG. 7B, showing the updating of a model, consistent with FIG. 12E. In FIG. 12E, the distal thumb segment 552 of the model is adjusted to become the segment 1250, and the proximal thumb segment 552 of the model is adjusted to become the segment 1252. In this case, the thumb is moved generally downward relative to the palm as well as being rotated. This is the new state of the model which more closely matches the depth pixels of the depth sensor.

FIG. 13A depicts further details of steps 768, 770 and 772 of FIG. 7B for comparing depth pixels of a model to depth pixels of a sensor, where a comparison plane 1310 is transverse or orthogonal to a depth axis 1302 of a depth sensor 1300. Axes 1304, 1306 and 1308 are also parallel to (as indicated by the notation "H") the depth axis 1302. Comparison plane 1310 includes two example pixels of the rasterized model, p1 and p4, while a plane 1312 includes two example pixels from the depth sensor, p2 and p3. Comparison planes 1310 and 1312 extend parallel to the x and y axes, and therefore transverse/orthogonal to the depth axis 1302, in one approach. In another approach, the comparison planes 1310 and 1312 are offset slightly from the x and y axes, and are transverse to a line of sight 1305 from the depth camera, which extends at an angle of $\alpha$ to the depth axis 1302.

P2 is an overlapping depth pixel of the depth sensor (FIG. 7B, step 768) because it overlaps with p1, e.g., along axis 1306. P1 can also be thought of as a corresponding overlapping depth pixel of the model. An example joint of the model is j1. In one approach, the adjustment vector 1328 extends in a direction from the best match joint j1 to p2. In another approach, an adjustment vector 1326 extends in a direction from p1 to p2. Moreover, the vector 1326 can be translated to a vector 1330 which acts on the joint j1.

P3 is a non-overlapping depth pixel of the depth sensor (FIG. 7B, step 770) because it does not overlap a pixel of the model, e.g., along axis 1308. As discussed previously in connection with step 778 of FIG. 7B, an example adjustment vector 1320 for p3 extends in a direction from the joint j1 to p3.

P4 is a non-overlapping depth pixel of the model (FIG. 7B, step 772) because it does not overlap a pixel of the depth sensor data, e.g., along axis 1304. A corresponding adjustment vector 1322 extends from p4 to a closest depth pixel of the sensor data, assumed to be p2 in this example. In another approach, an adjustment vector 1324 for p4 extends from p4 along the depth axis 1302/1304, such as toward the plane 1312 of the closest depth pixel of the sensor data. The vector 1322 or 1324 can be translated to a vector (not shown) which acts on the joint j1 further details of the comparison plane 1310 of FIG. 13A. P1 and p2 are overlapping pixels, p3 of the depth sensor is non-overlapping with a pixel of the model, and p4 of the model is non-overlapping with a pixel of the depth sensor. ||x and ||y are axes which are parallel to the x- and y-axes, respectively.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer readable storage device having computer readable software embodied thereon for programming at least one processor to perform a method for modeling a pose of articulated body portions of an object, the method comprising:

obtaining depth pixels of the articulated body portions of the object in one or more frames;

processing the depth pixels of the one or more frames to identify centroids of each of the articulated body portions of the object;

accessing a model, the model includes articulated body portions which correspond to the articulated body portions of the object, wherein each of the articulated body portions of the model has at least one representative attract point;

matching the representative attract point, for each of the articulated body portions of the model to the centroids for each of the articulated body portions of the object and performing a rigid transform of the model, based on a comparison between the representative attract points and the centroids;

refining the match by performing a non-rigid transform of the model based on a comparison between the representative attract points and the centroids, resulting in changes to relative orientations and locations of the articulated body portions of the model; and further refining the match by rasterizing the model to provide depth pixels of the model, and by performing a non-rigid transform of the model based on a comparison between the depth pixels of the one or more frames and the depth pixels of the model.

2. The computer readable storage device of claim 1, wherein:
the performing a rigid transform comprises performing translating, rotating and scaling of the model.

3. The computer readable storage device of claim 1, wherein:
the rigid transform is computed in a closed form.

4. The computer readable storage device of claim 1, wherein:
the comparison between the representative attract points and the centroids is performed in multiple iterations and in each of the multiple iterations: the comparison identifies, from among the depth pixels of the one or more frames, non-overlapping depth pixels of the one or more frames which are not overlapping in at least one comparison plane with the depth pixels of the model;
each of the articulated body portions of the model has at least one joint;
at least one of the articulated body portions of the model is adjacent to the non-overlapping depth pixels of the one or more frames;
each of the multiple iterations provides adjustment vectors for the joints based on the comparison to move at least one of the joints of the at least one of the articulated body portions of the model to more closely match the non-overlapping depth pixels of the one or more frames; and
the multiple iterations are performed until a stop criterion is met, the stop criterion is based on at least one of magnitudes of the adjustment vectors, number of iterations, and computation time.

5. The computer readable storage device of claim 4, wherein:
the adjustment vectors are based on collision constraints for collisions between the articulated body portions of the model, distance constraints for distances between joints of adjacent portions of the articulated body portions of the model, and angle constraints for angles between the adjacent portions of the articulated body portions of the model.

6. The computer readable storage device of claim 4, wherein:
in each of the multiple iterations: the comparison identifies, from among the depth pixels of the one or more frames, overlapping depth pixels of the one or more frames which are overlapping in the at least one comparison plane with depth pixels of the at least one of the articulated body portions of the object; and
the adjustment vectors move at least one of the joints of the at least one of the articulated body portions of the model to more closely match the overlapping depth pixels of the one or more frames.

7. The computer readable storage device of claim 6, wherein:
in each of the multiple iterations: the comparison identifies, from among the depth pixels of the model, non-overlapping depth pixels of the model which are not overlapping in the at least one comparison plane with the depth pixels of the one or more frames; and
the adjustment vectors move at least one of the joints of the at least one of the articulated body portions of the model in a direction which tends to equalize a number of the non-overlapping depth pixels of the model around a perimeter of the at least one of the articulated body portions of the model.

8. The computer readable storage device of claim 6, wherein the method performed further comprises:
for the non-overlapping depth pixels of the one or more frames, for the overlapping depth pixels of the one or more frames, and for the at least one of the articulated body portions of the model: determining a probability that the depth pixel is part of the at least one of the articulated body portions of the model, the adjustment vectors are based on a highest scoring joint of the model as determined by probabilities and distances.

9. The computer readable storage device of claim 1, wherein:
the articulated body portions of the object comprise a palm, finger segments and thumb segments.

10. A method for modeling a pose of articulated body portions of an object, the method comprising:
obtaining depth pixels of the articulated body portions of the object in one or more frames;
processing the depth pixels of the one or more frames to identify centroids of each of the articulated body portions of the object;
accessing a model, the model includes articulated body portions which correspond to the articulated body portions of the object, wherein each of the articulated body portions of the model has at least one representative attract point;
matching the representative attract point for each of the articulated body portions of the model to the centroids for each of the articulated body portions of the object and performing a rigid transform of the model, based on a comparison between the representative attract points and the centroids;
refining the match by performing a non-rigid transform of the model based on a comparison between the representative attract points and the centroids, resulting in changes to relative orientations and locations of the articulated body portions of the model; and
further refining the match by rasterizing the model to provide depth pixels of the model, and by performing a non-rigid transform of the model based on a comparison between the depth pixels of the one or more frames and the depth pixels of the model.

11. The method of claim 10, wherein:
the performing a rigid transform comprises performing translating, rotating and scaling of the model.

12. The method of claim 10, wherein:
the rigid transform is computed in a closed form.

13. The method of claim 10, wherein:
the comparison between the representative attract points and the centroids is performed in multiple iterations and in each of the multiple iterations: the comparison identifies, from among the depth pixels of the one or more frames, non-overlapping depth pixels of the one or more frames which are not overlapping in at least one comparison plane with the depth pixels of the model;

each of the articulated body portions of the model has at least one joint;

at least one of the articulated body portions of the model is adjacent to the non-overlapping depth pixels of the one or more frames;

each of the multiple iterations provides adjustment vectors for the joints based on the comparison to move at least one of the joints of the at least one of the articulated body portions of the model to more closely match the non-overlapping depth pixels of the one or more frames; and the multiple iterations are performed until a stop criterion is met, the stop criterion is based on at least one of magnitudes of the adjustment vectors, number of iterations, and computation time.

14. The method of claim 13, wherein:

the adjustment vectors are based on collision constraints for collisions between the articulated body portions of the model, distance constraints for distances between joints of adjacent portions of the articulated body portions of the model, and angle constraints for angles between the adjacent portions of the articulated body portions of the model.

15. The method of claim 13, wherein:

in each of the multiple iterations: the comparison identifies, from among the depth pixels of the one or more frames, overlapping depth pixels of the one or more frames which are overlapping in the at least one comparison plane with depth pixels of the at least one of the articulated body portions of the object; and the adjustment vectors move at least one of the joints of the at least one of the articulated body portions of the model to more closely match the overlapping depth pixels of the one or more frames.

16. The method of claim 15, wherein:

in each of the multiple iterations: the comparison identifies, from among the depth pixels of the model, non-overlapping depth pixels of the model which are not overlapping in the at least one comparison plane with the depth pixels of the one or more frames; and the adjustment vectors move at least one of the joints of the at least one of the articulated body portions of the model in a direction which tends to equalize a number of the non-overlapping depth pixels of the model around a perimeter of the at least one of the articulated body portions of the model.

17. The method of claim 15, wherein the method performed further comprises:

for the non-overlapping depth pixels of the one or more frames, for the overlapping depth pixels of the one or more frames, and for the at least one of the articulated body portions of the model: determining a probability that the depth pixel is part of the at least one of the articulated body portions of the model, the adjustment vectors are based on a highest scoring joint of the model as determined by probabilities and distances.

18. The method of claim 10, wherein:

the articulated body portions of the object comprise a palm, finger segments and thumb segments.

* * * * *